(12) United States Patent
Cheng et al.

(10) Patent No.: US 10,985,886 B2
(45) Date of Patent: Apr. 20, 2021

(54) DOWNLINK CHANNEL DECODING METHOD, DOWNLINK INFORMATION TRANSMISSION METHOD, USER EQUIPMENT, AND BASE STATION

(71) Applicant: Huawei Technologies Co., Ltd., Shenzhen (CN)

(72) Inventors: Yan Cheng, Beijing (CN); Yongxing Zhou, Beijing (CN); Lixia Xue, Beijing (CN); Brian Classon, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/554,198

(22) Filed: Aug. 28, 2019

(65) Prior Publication Data
US 2019/0386802 A1    Dec. 19, 2019

Related U.S. Application Data

(63) Continuation of application No. 15/783,387, filed on Oct. 13, 2017, now abandoned, which is a
(Continued)

(51) Int. Cl.
*H04L 5/00* (2006.01)
*H04W 72/04* (2009.01)
(Continued)

(52) U.S. Cl.
CPC ........ *H04L 5/0051* (2013.01); *H04J 11/0073* (2013.01); *H04J 11/0076* (2013.01);
(Continued)

(58) Field of Classification Search
CPC ... H04L 5/0007; H04L 5/0051; H04L 5/0053; H04L 72/005; H04L 72/04
See application file for complete search history.

(56) References Cited

U.S. PATENT DOCUMENTS

| 2009/0245190 A1 | 10/2009 | Higuchi et al. |
| 2011/0237283 A1 | 9/2011 | Shan et al. |

(Continued)

FOREIGN PATENT DOCUMENTS

| CN | 101507344 A | 8/2009 |
| CN | 101909356 A | 12/2010 |

(Continued)

OTHER PUBLICATIONS

U.S. Appl. No. 15/783,387, filed Oct. 13, 2017.
(Continued)

*Primary Examiner* — Gary Mui
(74) *Attorney, Agent, or Firm* — Leydig, Voit & Mayer, Ltd.

(57) ABSTRACT

A downlink channel decoding method, a downlink information transmission method, a user equipment, and a base station are provided. The downlink channel decoding method includes: determining, by a user equipment, a resource unit occupied by a DMRS; and decoding a downlink channel based on the DMRS transmitted on the resource unit. The present invention can enable different DMRS patterns to concurrently exist on an NCT carrier. In a downlink transmission process, a DMRS pattern used for downlink transmission is determined according to priorities of different channels and/or signals, which can ensure optimal performance of a high-priority channel and/or signal, and can further improve downlink transmission performance.

10 Claims, 4 Drawing Sheets

Related U.S. Application Data continuation of application No. 14/807,082, filed on Jul. 23, 2015, now Pat. No. 9,813,213, which is a continuation of application No. PCT/CN2013/070986, filed on Jan. 25, 2013.

(51) Int. Cl.
| *H04J 11/00* | (2006.01) |
|---|---|
| *H04W 48/12* | (2009.01) |
| *H04W 72/00* | (2009.01) |

(52) U.S. Cl.
CPC ........ *H04J 11/0079* (2013.01); *H04L 5/0007* (2013.01); *H04L 5/0053* (2013.01); *H04W 48/12* (2013.01); *H04W 72/005* (2013.01); *H04W 72/04* (2013.01); *H04J 2011/0096* (2013.01)

(56) References Cited

U.S. PATENT DOCUMENTS

| 2012/0207119 | A1* | 8/2012 | Zhang | H04L 5/0051 |
| --- | --- | --- | --- | --- |
| | | | | 370/329 |
| 2012/0230290 | A1 | 9/2012 | Seo et al. | |
| 2012/0275415 | A1 | 11/2012 | Wang et al. | |
| 2012/0307768 | A1 | 12/2012 | Xu et al. | |
| 2012/0320846 | A1 | 12/2012 | Papasakellariou et al. | |
| 2013/0044727 | A1 | 2/2013 | Nory et al. | |
| 2013/0182664 | A1* | 7/2013 | Chen | H04L 1/0046 |
| | | | | 370/329 |
| 2013/0265945 | A1* | 10/2013 | He | H04N 21/643 |
| | | | | 370/329 |
| 2013/0265955 | A1* | 10/2013 | Kim | H04W 72/02 |
| | | | | 370/329 |
| 2013/0301491 | A1 | 11/2013 | Bashar et al. | |
| 2014/0169201 | A1 | 6/2014 | Tamura et al. | |
| 2014/0219237 | A1* | 8/2014 | Charbit | H04L 5/005 |
| | | | | 370/330 |
| 2014/0362722 | A1 | 12/2014 | Loehr et al. | |
| 2015/0230211 | A1* | 8/2015 | You | H04W 72/04 |
| | | | | 370/330 |
| 2015/0341931 | A1 | 11/2015 | Zhang et al. | |
| 2016/0135151 | A1 | 5/2016 | Noh et al. | |

FOREIGN PATENT DOCUMENTS

| CN | 101932073 | A | 12/2010 |
| --- | --- | --- | --- |
| CN | 102088434 | A | 6/2011 |
| CN | 102149082 | A | 8/2011 |
| CN | 102598530 | A | 7/2012 |
| CN | 102835060 | A | 12/2012 |
| WO | 2008114981 | A1 | 9/2008 |
| WO | 2011053051 | A2 | 5/2011 |
| WO | 2011085195 | A1 | 7/2011 |
| WO | 2011099663 | A1 | 8/2011 |

OTHER PUBLICATIONS

U.S. Appl. No. 14/807,082, filed Jul. 23, 2015.

"Performance Evaluation of DMRS Pattern for New Carrier Type," 3GPP TSG RAN WG1 Meeting #72, St Julian's, Malta, R1-130251, pp. 1-10, 3rd Generation Partnership Project, Valbonne, France (Jan. 28-Feb. 1, 2013).

"Views on Multiplexing of Control Channel and PCCH for NCT," 3GPP TSG RAN WG1 Meeting #72, R1-130444, St. Julian's, Malta, pp. 1-3, 3rd Generation Partnership Project, Valbonne, France (Jan. 28-Feb. 1, 2013).

"PSS/SSS Collisions with DM-RS," 3GPP TSG RAN WG1 Meeting #72, R1-130010, Huawei, HiSilicon, St. Julian's, Malta, XP50663492A, pp. 1-6, 3rd Generation Partnership Project, Valbonne, France (Jan. 28-Feb. 1, 2013).

"Handling the Conflict of PSS/SSS and DMS-RS in NCT," 3GPP TSG RAN WG1#69, R1-122275, Prague, Czech Republic, pp. 1-7, 3rd Generation Partnership Project, Valbonne, France (May 21-25, 2012).

"Handling the Conflict of PSS/SSS and DM-RS in NCT," 3GPP TSG RAN WG1#71, New Orleans, USA, R1-124989, pp. 1-6, 3rd Generation Partnership Project, Valbonne, France (Nov. 12-16, 2012).

"Handling the Conflict of PSS/SSS and DM-RS in NCT," LG Electronics, 3GPP TSG RAN WG1 #71, New Orleans, USA, R1-124989,, pp. 1-6, 3rd Generation Partnership Project, Valbonne, France (Nov. 12-16, 2012).

\* cited by examiner

DOWNLINK CHANNEL DECODING METHOD, DOWNLINK INFORMATION TRANSMISSION METHOD, USER EQUIPMENT, AND BASE STATION

CROSS-REFERENCE TO RELATED APPLICATIONS

This application is a continuation of U.S. patent application Ser. No. 15/783,387, filed on Oct. 13, 2017, which is a continuation of U.S. patent application Ser. No. 14/807,082, filed on Jul. 23, 2015, now U.S. Pat. No. 9,813,213, which is a continuation of International Application No. PCT/CN2013/070986, filed on Jan. 25, 2013. All of the aforementioned patent applications are hereby incorporated by reference in their entireties.

TECHNICAL FIELD

The present disclosure relates to the field of communications technologies, and in particular, to a downlink channel decoding method, a downlink information transmission method, a user equipment, and a base station.

BACKGROUND

In a Long Term Evolution (LTE) system version 8, version 9, or version 10, each LTE carrier is backward compatible. Each carrier needs to send a primary synchronization signal (PSS), a secondary synchronization signal (SSS), a physical broadcast channel (PBCH), a system information block (SIB), a physical downlink control channel (PDCCH), cell-specific reference signals (CRS) of all frequency bands and all subframes, and the like that have same resource locations and sending manners as those in the LTE system version 8. Specifically, sending periods of a PSS and an SSS are five subframes. Frequency domain locations of the PSS and the SSS are within a frequency domain width of six physical resource block pairs at a carrier center, and the PSS and the SSS occupy two symbols in a time domain. A PBCH occupies, in a time domain, the first four symbols of a second timeslot in subframe 0, and is also located, in a frequency domain, within a frequency domain width of six physical resource block pairs at a carrier center.

In addition, in LTE version 10, a demodulation reference signal (DMRS) is further introduced, and is used by a physical downlink shared channel (PDSCH) to perform data demodulation. The DMRS is sent only on a physical resource block (PRB) that is used to transmit a PDSCH. In LTE version 11, an enhanced physical downlink control channel (EPDCCH) is further introduced. Frequency division multiplexing is performed between the enhanced physical downlink control channel and a PDSCH, and demodulation is also performed by using a DMRS.

In LTE version 12 or a later version, a new carrier type (NCT) carrier is introduced. The NCT carrier may be a non-backward compatible carrier, and at least some subframes in the NCT carrier do not have a downlink control region that exists in LTE version 8.

However, because the first four symbols on a backward compatible carrier may be used to transmit a control channel, a DMRS cannot be transmitted in this region. An existing DMRS is sent only on a symbol in a rear part of a subframe in a centralized way. Moreover, in the prior art, a DMRS pattern on a backward compatible carrier is also used on an NCT carrier, that is, on the NCT carrier, a DMRS is sent only on a symbol in a rear part of a subframe in a centralized way, which results in relatively poor downlink transmission performance of the NCT carrier.

SUMMARY

Embodiments of the present invention provide a downlink channel decoding method, a downlink information transmission method, a user equipment, and a base station, so that different DMRS patterns can concurrently exist on an NCT carrier, and a DMRS pattern used for downlink transmission is determined according to priorities of different channels and/or signals in a downlink transmission process, thereby improving downlink transmission performance.

A first aspect of the present invention provides a downlink channel decoding method, including:
 determining, by a user equipment, a resource unit occupied by a demodulation reference signal DMRS; and
 decoding, by the user equipment, a downlink channel based on the DMRS transmitted on the resource unit.

With reference to the first aspect, in a first possible implementation manner of the first aspect, the determining, by a user equipment, a resource unit occupied by a demodulation reference signal DMRS includes:
 determining, by the user equipment based on a first DMRS pattern and in a subframe in which there is a first signal transmitted, the resource unit occupied by the DMRS;
 and determining, based on a second DMRS pattern and in a subframe in which there is no first signal transmitted, the resource unit occupied by the DMRS, where a time domain symbol occupied by the first DMRS pattern is not completely the same as a time domain symbol occupied by the second DMRS pattern.

With reference to the first aspect, in a second possible implementation manner of the first aspect, the determining, by a user equipment, the resource unit occupied by the demodulation reference signal DMRS includes:
 determining, by the user equipment based on a first DMRS pattern and in a subframe in which there is a first channel transmitted, the resource unit occupied by the DMRS; and determining, based on a second DMRS pattern and in a subframe in which there is no first channel transmitted, the resource unit occupied by the DMRS, where a time domain symbol occupied by the first DMRS pattern is not completely the same as a time domain symbol occupied by the second DMRS pattern.

With reference to the second possible implementation manner of the first aspect, in a third possible implementation manner of the first aspect, the first channel is a physical multicast channel, the subframe in which there is a first channel transmitted is a multicast broadcast single frequency network subframe, and the subframe in which there is no first channel transmitted is a non-multicast broadcast single frequency network subframe.

With reference to the first aspect, in a fourth possible implementation manner of the first aspect, the determining, by the user equipment, the resource unit occupied by the demodulation reference signal DMRS includes:
 determining, by the user equipment, whether a frequency band used to transmit the downlink channel overlaps a frequency band used to transmit a first signal, if overlapping exists, determining, by the user equipment based on a first DMRS pattern, the resource unit occupied by the DMRS, and if overlapping does not exist, determining, by the user equipment based on a second DMRS pattern, the resource unit occupied by the DMRS, where a time domain symbol occupied by the first DMRS pattern is not completely the same as a time domain symbol occupied by the second DMRS pattern.

With reference to the first possible implementation manner of the first aspect or the fourth possible implementation manner of the first aspect, in a fifth possible implementation manner of the first aspect, the first signal includes one or a combination of a primary synchronization signal, a secondary synchronization signal, a channel state information-reference signal, a cell-specific reference signal, and a discovery reference signal.

With reference to any one of the first to fourth possible implementation manners of the first aspect, in a sixth possible implementation manner of the first aspect, the resource unit that is occupied by the DMRS and determined based on the first DMRS pattern is located on the last two symbols of each timeslot.

With reference to any one of the first to fourth possible implementation manners of the first aspect, in a seventh possible implementation manner of the first aspect, the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot.

With reference to the first, fourth, or fifth possible implementation manner of the first aspect, in an eighth possible implementation manner of the first aspect, both the subframe in which there is a first signal transmitted and the subframe in which there is no first signal transmitted belong to normal subframes, or both the subframe in which there is a first signal transmitted and the subframe in which there is no first signal transmitted belong to special subframes.

With reference to the first aspect, in a ninth possible implementation manner of the first aspect, the determining, by the user equipment, the resource unit occupied by the demodulation reference signal DMRS includes:

if the downlink channel is a physical downlink shared channel, determining, by the user equipment based on a first DMRS pattern, the resource unit occupied by the DMRS; and if the downlink channel is an enhanced physical downlink control channel, determining, by the user equipment based on a second DMRS pattern, the resource unit occupied by the DMRS.

With reference to the ninth possible implementation manner of the first aspect, in a tenth possible implementation manner of the first aspect, if the resource unit that is occupied by the DMRS and determined based on the second DMRS pattern overlaps a resource unit used to transmit a second signal, the second signal is not transmitted on an overlapping resource unit.

With reference to the tenth possible implementation manner of the first aspect, in an eleventh possible implementation manner of the first aspect, the second signal includes a channel state information-reference signal or a cell-specific reference signal.

With reference to the first aspect, in a twelfth possible implementation manner of the first aspect, the determining, by the user equipment, the resource unit occupied by the demodulation reference signal DMRS includes:

determining, by the user equipment based on dynamic signaling, a resource unit occupied by a DMRS.

With reference to the twelfth possible implementation manner of the first aspect, in a thirteenth possible implementation manner of the first aspect, the determining, by the user equipment based on dynamic signaling, the resource unit occupied by the DMRS includes:

determining, by the user equipment based on a specified information field in downlink allocation, the resource unit occupied by the DMRS.

With reference to the thirteenth possible implementation manner of the first aspect, in a fourteenth possible implementation manner of the first aspect, the specified information field is a hybrid automatic repeat request acknowledgement resource offset field.

A second aspect of the present invention provides a downlink information transmission method, including:

determining, by a base station, a resource unit occupied by a demodulation reference signal DMRS; and sending, by the base station, the DMRS on the determined resource unit occupied by the DMRS, so that a user equipment decodes a downlink channel based on the DMRS.

With reference to the second aspect, in a first possible implementation manner of the second aspect, the determining, by the base station, the resource unit occupied by the demodulation reference signal DMRS includes:

determining, by the base station based on a first DMRS pattern and in a subframe in which there is a first signal transmitted, the resource unit occupied by the DMRS; and determining, based on a second DMRS pattern and in a subframe in which there is no first signal transmitted, the resource unit occupied by the DMRS, where a time domain symbol occupied by the first DMRS pattern is not completely the same as a time domain symbol occupied by the second DMRS pattern.

With reference to the second aspect, in a second possible implementation manner of the second aspect, the determining, by the base station, the resource unit occupied by the demodulation reference signal DMRS includes:

determining, by the base station based on a first DMRS pattern and in a subframe in which there is a first channel transmitted, the resource unit occupied by the DMRS; and determining, based on a second DMRS pattern and in a subframe in which there is no first channel transmitted, the resource unit occupied by the DMRS, where a time domain symbol occupied by the first DMRS pattern is not completely the same as a time domain symbol occupied by the second DMRS pattern.

With reference to the second possible implementation manner of the second aspect, in a third possible implementation manner of the second aspect, the first channel is a physical multicast channel, the subframe in which there is a first channel transmitted is a multicast broadcast single frequency network subframe, and the subframe in which there is no first channel transmitted is a non-multicast broadcast single frequency network subframe.

With reference to the second aspect, in a fourth possible implementation manner of the second aspect, the determining, by the base station, the resource unit occupied by the demodulation reference signal DMRS includes:

determining, by the base station, whether a frequency band used to transmit the downlink channel overlaps a frequency band used to transmit a first signal, if overlapping exists, determining, by the base station based on a first DMRS pattern, the resource unit occupied by the DMRS, and if overlapping does not exist, determining, by the base station based on a second DMRS pattern, the resource unit occupied by the DMRS, where a time domain symbol occupied by the first DMRS pattern is not completely the same as a time domain symbol occupied by the second DMRS pattern.

With reference to the first possible implementation manner or the fourth possible implementation manner of the second aspect, in a fifth possible implementation manner of the second aspect, the first signal includes one or a combination of a primary synchronization signal, a secondary synchronization signal, a channel state information-reference signal, a cell-specific reference signal, and a discovery reference signal.

With reference to any one of the first to fourth possible implementation manners of the second aspect, in a sixth possible implementation manner of the second aspect, the resource unit that is occupied by the DMRS and determined based on the first DMRS pattern is located on the last two symbols of each timeslot.

With reference to any one of the first to fourth possible implementation manners of the second aspect, in a seventh possible implementation manner of the second aspect, the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot.

With reference to the first, fourth, or fifth possible implementation manner of the second aspect, in an eighth possible implementation manner of the second aspect, both the subframe in which there is a first signal transmitted and the subframe in which there is no first signal transmitted belong to normal subframes, or both the subframe in which there is a first signal transmitted and the subframe in which there is no first signal transmitted belong to special subframes.

With reference to the second aspect, in a ninth possible implementation manner of the second aspect, the determining, by the base station, the resource unit occupied by the demodulation reference signal DMRS includes:

if the downlink channel is a physical downlink shared channel, determining, by the base station based on a first DMRS pattern, the resource unit occupied by the DMRS; and if the downlink channel is an enhanced physical downlink control channel, determining, by the base station based on a second DMRS pattern, the resource unit occupied by the DMRS.

With reference to the ninth possible implementation manner of the second aspect, in a tenth possible implementation manner of the second aspect, if the resource unit that is occupied by the DMRS and determined based on the second DMRS pattern overlaps a resource unit used to transmit a second signal, the second signal is not transmitted on the overlapping resource unit.

With reference to the tenth possible implementation manner of the second aspect, in an eleventh possible implementation manner of the second aspect, the second signal includes a channel state information-reference signal or a cell-specific reference signal.

With reference to the second aspect, in a twelfth possible implementation manner of the second aspect, after the determining, by the base station, the resource unit occupied by the demodulation reference signal DMRS, the method further includes:

indicating, by the base station, the resource unit occupied by the DMRS to the user equipment by using dynamic signaling.

With reference to the twelfth possible implementation manner of the second aspect, in a thirteenth possible implementation manner of the second aspect, the indicating, by the base station, the resource unit occupied by the DMRS to the user equipment by using dynamic signaling includes:

indicating, by the base station, the resource unit occupied by the DMRS to the user equipment by using a specified information field in downlink allocation.

With reference to the thirteenth possible implementation manner of the second aspect, in a fourteenth possible implementation manner of the second aspect, the specified information field is a hybrid automatic repeat request acknowledgement resource offset field.

A third aspect of the present invention provides a user equipment, including:

a determining module, configured to determine a resource unit occupied by a demodulation reference signal DMRS; and a decoding module, configured to decode a downlink channel based on the DMRS transmitted on the resource unit determined by the determining module.

With reference to the third aspect, in a first possible implementation manner of the third aspect, the determining module is specifically configured to: determine, based on a first DMRS pattern and in a subframe in which there is a first signal transmitted, the resource unit occupied by the DMRS, and determine, based on a second DMRS pattern and in a subframe in which there is no first signal transmitted, the resource unit occupied by the DMRS, where a time domain symbol occupied by the first DMRS pattern is not completely the same as a time domain symbol occupied by the second DMRS pattern.

With reference to the third aspect, in a second possible implementation manner of the third aspect, the determining module is specifically configured to: determine, based on a first DMRS pattern and in a subframe in which there is a first channel transmitted, the resource unit occupied by the DMRS, and determine, based on a second DMRS pattern and in a subframe in which there is no first channel transmitted, the resource unit occupied by the DMRS, where a time domain symbol occupied by the first DMRS pattern is not completely the same as a time domain symbol occupied by the second DMRS pattern.

With reference to the second possible implementation manner of the third aspect, in a third possible implementation manner of the third aspect, the first channel is a physical multicast channel, the subframe in which there is a first channel transmitted is a multicast broadcast single frequency network subframe, and the subframe in which there is no first channel transmitted is a non-multicast broadcast single frequency network subframe.

With reference to the third aspect, in a fourth possible implementation manner of the third aspect, the determining module is specifically configured to: determine whether a frequency band used to transmit the downlink channel overlaps a frequency band used to transmit a first signal, if overlapping exists, determine, based on a first DMRS pattern, the resource unit occupied by the DMRS, and if overlapping does not exist, determine, based on a second DMRS pattern, the resource unit occupied by the DMRS, where a time domain symbol occupied by the first DMRS pattern is not completely the same as a time domain symbol occupied by the second DMRS pattern.

With reference to the first or fourth possible implementation manner of the third aspect, in a fifth possible implementation manner of the third aspect, the first signal includes one or a combination of a primary synchronization signal, a secondary synchronization signal, a channel state information-reference signal, a cell-specific reference signal, and a discovery reference signal.

With reference to any one of the first to fourth possible implementation manners of the third aspect, in a sixth possible implementation manner of the third aspect, the resource unit that is occupied by the DMRS and determined by the determining module based on the first DMRS pattern is located on the last two symbols of each timeslot.

With reference to any one of the first to fourth possible implementation manners of the third aspect, in a seventh possible implementation manner of the third aspect, the resource unit that is occupied by the DMRS and determined by the determining module based on the first DMRS pattern is located on the last two symbols of each timeslot, and the resource unit that is occupied by the DMRS and determined by the determining module based on the second DMRS pattern is located on the third symbol and the fourth symbol of each timeslot.

With reference to the first, fourth, or fifth possible implementation manner of the third aspect, in an eighth possible implementation manner of the third aspect, both the subframe in which there is a first signal transmitted and the subframe in which there is no first signal transmitted belong to normal subframes, or both the subframe in which there is a first signal transmitted and the subframe in which there is no first signal transmitted belong to special subframes.

With reference to the third aspect, in a ninth possible implementation manner of the third aspect, the determining module is specifically configured to: when the downlink channel is a physical downlink shared channel, determine, based on a first DMRS pattern, the resource unit occupied by the DMRS, and when the downlink channel is an enhanced physical downlink control channel, determine, based on a second DMRS pattern, the resource unit occupied by the DMRS.

With reference to the ninth possible implementation manner of the third aspect, in a tenth possible implementation manner of the third aspect, if the resource unit that is occupied by the DMRS and determined by the determining module based on the second DMRS pattern overlaps with a resource unit used to transmit a second signal, the second signal is not transmitted on an overlapping resource unit.

With reference to the tenth possible implementation manner of the third aspect, in an eleventh possible implementation manner of the third aspect, the second signal includes a channel state information-reference signal or a cell-specific reference signal.

With reference to the third aspect, in a twelfth possible implementation manner of the third aspect, the determining module is specifically configured to determine, based on dynamic signaling, the resource unit occupied by the DMRS.

With reference to the twelfth possible implementation manner of the third aspect, in a thirteenth possible implementation manner of the third aspect, the determining module is specifically configured to determine, based on a specified information field in downlink allocation, the resource unit occupied by the DMRS.

With reference to the thirteenth possible implementation manner of the third aspect, in a fourteenth possible implementation manner of the third aspect, the specified information field is a hybrid automatic repeat request acknowledgement resource offset field.

A fourth aspect of the present invention provides a base station, including:
a determining module, configured to determine a resource unit occupied by a demodulation reference signal DMRS; and
a sending module, configured to send the DMRS on the resource unit that is occupied by the DMRS and determined by the determining module, so that a user equipment decodes a downlink channel based on the DMRS.

With reference to the fourth aspect, in a first possible implementation manner of the fourth aspect, the determining module is specifically configured to: determine, based on a first DMRS pattern and in a subframe in which there is a first signal transmitted, the resource unit occupied by the DMRS, and determine, based on a second DMRS pattern and in a subframe in which there is no first signal transmitted, the resource unit occupied by the DMRS, where a time domain symbol occupied by the first DMRS pattern is not completely the same as a time domain symbol occupied by the second DMRS pattern.

With reference to the fourth aspect, in a second possible implementation manner of the fourth aspect, the determining module is specifically configured to: determine, based on a first DMRS pattern and in a subframe in which there is a first channel transmitted, a resource unit occupied by a DMRS, and determine, based on a second DMRS pattern and in a subframe in which there is no first channel transmitted, a resource unit occupied by a DMRS, where a time domain symbol occupied by the first DMRS pattern is not completely the same as a time domain symbol occupied by the second DMRS pattern.

With reference to the second possible implementation manner of the fourth aspect, in a third possible implementation manner of the fourth aspect, the first channel is a physical multicast channel, the subframe in which there is a first channel transmitted is a multicast broadcast single frequency network subframe, and the subframe in which there is no first channel transmitted is a non-multicast broadcast single frequency network subframe.

With reference to the fourth aspect, in a fourth possible implementation manner of the fourth aspect, the determining module is specifically configured to: determine whether a frequency band used to transmit the downlink channel overlaps a frequency band used to transmit a first signal, if overlapping exists, determine, based on a first DMRS pattern, the resource unit occupied by the DMRS, and if overlapping does not exist, determine, based on the second DMRS pattern, the resource unit occupied by the DMRS, where a time domain symbol occupied by the first DMRS pattern is not completely the same as a time domain symbol occupied by the second DMRS pattern.

With reference to the first or fourth possible implementation manner of the fourth aspect, in a fifth possible implementation manner of the fourth aspect, the first signal includes one or a combination of a primary synchronization signal, a secondary synchronization signal, a channel state information-reference signal, a cell-specific reference signal, and a discovery reference signal.

With reference to any one of the first to fourth possible implementation manners of the fourth aspect, in a sixth possible implementation manner of the fourth aspect, the resource unit that is occupied by the DMRS and determined by the determining module based on the first DMRS pattern is located on the last two symbols of each timeslot.

With reference to any one of the first to fourth possible implementation manners of the fourth aspect, in a seventh possible implementation manner of the fourth aspect, the resource unit that is occupied by the DMRS and determined by the determining module based on the first DMRS pattern is located on the last two symbols of each timeslot, and the resource unit that is occupied by the DMRS and determined by the determining module based on the second DMRS pattern is located on the third symbol and the fourth symbol of each timeslot.

With reference to the first, fourth, or fifth possible implementation manner of the fourth aspect, in an eighth possible implementation manner of the fourth aspect, both the subframe in which there is a first signal transmitted and the subframe in which there is no first signal transmitted belong to normal subframes, or both the subframe in which there is a first signal transmitted and the subframe in which there is no first signal transmitted belong to special subframes.

With reference to the fourth aspect, in a ninth possible implementation manner of the fourth aspect, the determining module is specifically configured to: when the downlink channel is a physical downlink shared channel, determine, based on a first DMRS pattern, the resource unit occupied by the DMRS, and when the downlink channel is an enhanced physical downlink control channel, determine, based on a second DMRS pattern, the resource unit occupied by the DMRS.

With reference to the ninth possible implementation manner of the fourth aspect, in a tenth possible implementation manner of the fourth aspect, if the resource unit that is occupied by the DMRS and determined by the determining module based on the second DMRS pattern overlaps a resource unit used to transmit a second signal, the second signal is not transmitted on an overlapping resource unit.

With reference to the tenth possible implementation manner of the fourth aspect, in an eleventh possible implementation manner of the fourth aspect, the second signal includes a channel state information-reference signal or a cell-specific reference signal.

With reference to the fourth aspect, in a twelfth possible implementation manner of the fourth aspect, the sending module is further configured to indicate the resource unit that is occupied by the DMRS and determined by the determining module to the user equipment by using dynamic signaling.

With reference to the twelfth possible implementation manner of the fourth aspect, in a thirteenth possible implementation manner of the fourth aspect, the sending module is specifically configured to indicate the resource unit occupied by the DMRS to the user equipment by using a specified information field in downlink allocation.

With reference to the thirteenth possible implementation manner of the fourth aspect, in a fourteenth possible implementation manner of the fourth aspect, the specified information field is a hybrid automatic repeat request acknowledgement resource offset field.

A fifth aspect of the present invention provides a user equipment, including: a transmitter, a receiver, a memory, and a processor that is connected to the transmitter, the receiver, and the memory separately, where the memory is configured to store a group of program code; and the processor is configured to: call the program code stored in the memory to: determine a resource unit occupied by a demodulation reference signal DMRS, and decode a downlink channel based on the DMRS transmitted on the resource unit.

With reference to the fifth aspect, in a first possible implementation manner of the fifth aspect, that the processor is configured to determine the resource unit occupied by the demodulation reference signal DMRS includes that:

the processor is specifically configured to: determine, based on a first DMRS pattern and in a subframe in which there is a first signal transmitted, the resource unit occupied by the DMRS and determine, based on a second DMRS pattern and in a subframe in which there is no first signal transmitted, the resource unit occupied by the DMRS, where a time domain symbol occupied by the first DMRS pattern is not completely the same as a time domain symbol occupied by the second DMRS pattern.

With reference to the fifth aspect, in a second possible implementation manner of the fifth aspect, that the processor is configured to determine the resource unit occupied by the demodulation reference signal DMRS includes that:

the processor is specifically configured to: determine, based on a first DMRS pattern and in a subframe in which there is a first channel transmitted, the resource unit occupied by the DMRS, and determine, based on a second DMRS pattern and in a subframe in which there is no first channel transmitted, the resource unit occupied by the DMRS, where a time domain symbol occupied by the first DMRS pattern is not completely the same as a time domain symbol occupied by the second DMRS pattern.

With reference to the second possible implementation manner of the fifth aspect, in a third possible implementation manner of the fifth aspect, the first channel is a physical multicast channel, the subframe in which there is a first channel transmitted is a multicast broadcast single frequency network subframe, and the subframe in which there is no first channel transmitted is a non-multicast broadcast single frequency network subframe.

With reference to the fifth aspect, in a fourth possible implementation manner of the fifth aspect, that the processor is configured to determine the resource unit occupied by the demodulation reference signal DMRS includes that:

the processor is specifically configured to: determine whether a frequency band used to transmit the downlink channel overlaps a frequency band used to transmit a first signal, if overlapping exists, determine, based on a first DMRS pattern, the resource unit occupied by the DMRS, and if overlapping does not exist, determine, based on a second DMRS pattern, the resource unit occupied by the DMRS, where a time domain symbol occupied by the first DMRS pattern is not completely the same as a time domain symbol occupied by the second DMRS pattern.

With reference to the first or fourth possible implementation manner of the fifth aspect, in a fifth possible implementation manner of the fifth aspect, the first signal includes one or a combination of a primary synchronization signal, a secondary synchronization signal, a channel state information-reference signal, a cell-specific reference signal, and a discovery reference signal.

With reference to any one of the first to fourth possible implementation manners of the fifth aspect, in a sixth possible implementation manner of the fifth aspect, the resource unit that is occupied by the DMRS and determined by the processor based on the first DMRS pattern is located on the last two symbols of each timeslot.

With reference to any one of the first to fourth possible implementation manners of the fifth aspect, in a seventh possible implementation manner of the fifth aspect, the resource unit that is occupied by the DMRS and determined by the processor based on the first DMRS pattern is located on the last two symbols of each timeslot, and the resource unit that is occupied by the DMRS and determined by the processor based on the second DMRS pattern is located on the third symbol and the fourth symbol of each timeslot.

With reference to the first, fourth, or fifth possible implementation manner of the fifth aspect, in an eighth possible implementation manner of the fifth aspect, both the subframe in which there is a first signal transmitted and the subframe in which there is no first signal transmitted belong to normal subframes, or both the subframe in which there is a first signal transmitted and the subframe in which there is no first signal transmitted belong to special subframes.

With reference to the fifth aspect, in a ninth possible implementation manner of the fifth aspect, that the processor is configured to determine the resource unit occupied by the demodulation reference signal DMRS includes that:

the processor is specifically configured to: when the downlink channel is a physical downlink shared channel, determine, based on a first DMRS pattern, the resource unit occupied by the DMRS, and when the downlink channel is an enhanced physical downlink control channel, determine, based on a second DMRS pattern, the resource unit occupied by the DMRS.

With reference to the ninth possible implementation manner of the fifth aspect, in a tenth possible implementation manner of the fifth aspect, if the resource unit that is occupied by the DMRS and determined by the processor based on the second DMRS pattern overlaps a resource unit used to transmit a second signal, the second signal is not transmitted on an overlapping resource unit.

With reference to the tenth possible implementation manner of the fifth aspect, in an eleventh possible implementation manner of the fifth aspect, the second signal includes a channel state information-reference signal or a cell-specific reference signal.

With reference to the fifth aspect, in a twelfth possible implementation manner of the fifth aspect, that the processor is configured to determine the resource unit occupied by the demodulation reference signal DMRS includes that:

the processor is specifically configured to determine, based on dynamic signaling, the resource unit occupied by the DMRS.

With reference to the twelfth possible implementation manner of the fifth aspect, in a thirteenth possible implementation manner of the fifth aspect, that the processor is specifically configured to determine, based on dynamic signaling, the resource unit occupied by the DMRS includes that:

the processor is specifically configured to determine, based on a specified information field in downlink allocation, the resource unit occupied by the DMRS.

With reference to the thirteenth possible implementation manner of the fifth aspect, in a fourteenth possible implementation manner of the fifth aspect, the specified information field is a hybrid automatic repeat request acknowledgement resource offset field.

A sixth aspect of the present invention provides a base station, including: a transmitter, a receiver, a memory, and a processor that is connected to the transmitter, the receiver, and the memory separately, where the memory is configured to store a group of program code;

the processor is configured to call the program code stored in the memory to determine a resource unit occupied by a demodulation reference signal DMRS; and the transmitter is configured to send the DMRS on the resource unit that is occupied by the DMRS and that is determined by the processor, so that a user equipment decodes a downlink channel based on the DMRS.

With reference to the sixth aspect, in a first possible implementation manner of the sixth aspect, the processor is specifically configured to: determine, based on a first DMRS pattern and in a subframe in which there is a first signal transmitted, the resource unit occupied by the DMRS, and determine, based on a second DMRS pattern and in a subframe in which there is no first signal transmitted, the resource unit occupied by the DMRS, where a time domain symbol occupied by the first DMRS pattern is not completely the same as a time domain symbol occupied by the second DMRS pattern.

With reference to the sixth aspect, in a second possible implementation manner of the sixth aspect, the processor is specifically configured to: determine, based on a first DMRS pattern and in a subframe in which there is a first channel transmitted, the resource unit occupied by the DMRS, and determine, based on a second DMRS pattern and in a subframe in which there is no first channel transmitted, the resource unit occupied by the DMRS, where a time domain symbol occupied by the first DMRS pattern is not completely the same as a time domain symbol occupied by the second DMRS pattern.

With reference to the second possible implementation manner of the sixth aspect, in a third possible implementation manner of the sixth aspect, the first channel is a physical multicast channel, the subframe in which there is a first channel transmitted is a multicast broadcast single frequency network subframe, and the subframe in which there is no first channel transmitted is a non-multicast broadcast single frequency network subframe.

With reference to the sixth aspect, in a fourth possible implementation manner of the sixth aspect, the processor is specifically configured to: determine whether a frequency band used to transmit the downlink channel overlaps a frequency band used to transmit a first signal, if overlapping exists, determine, based on a first DMRS pattern, the resource unit occupied by the DMRS, and if overlapping does not exist, determine, based on a second DMRS pattern, the resource unit occupied by the DMRS, where a time domain symbol occupied by the first DMRS pattern is not completely the same as a time domain symbol occupied by the second DMRS pattern.

With reference to the first or fourth possible implementation manner of the sixth aspect, in a fifth possible implementation manner of the sixth aspect, the first signal includes one or a combination of a primary synchronization signal, a secondary synchronization signal, a channel state information-reference signal, a cell-specific reference signal, and a discovery reference signal.

With reference to any one of the first to fourth possible implementation manners of the sixth aspect, in a sixth possible implementation manner of the sixth aspect, the resource unit that is occupied by the DMRS and determined by the processor based on the first DMRS pattern is located on the last two symbols of each timeslot.

With reference to any one of the first to fourth possible implementation manners of the sixth aspect, in a seventh possible implementation manner of the sixth aspect, the resource unit that is occupied by the DMRS and determined by the processor based on the first DMRS pattern is located on the last two symbols of each timeslot, and the resource unit that is occupied by the DMRS and determined by the processor based on the second DMRS pattern is located on the third symbol and the fourth symbol of each timeslot.

With reference to any one of the first, fourth, or fifth possible implementation manner of the sixth aspect, in an eighth possible implementation manner of the sixth aspect, both the subframe in which there is a first signal transmitted and the subframe in which there is no first signal transmitted belong to normal subframes, or both the subframe in which there is a first signal transmitted and the subframe in which there is no first signal transmitted belong to special subframes.

With reference to the sixth aspect, in a ninth possible implementation manner of the sixth aspect, the processor is specifically configured to: when the downlink channel is a physical downlink shared channel, determine, based on a first DMRS pattern, the resource unit occupied by the DMRS, and when the downlink channel is an enhanced physical downlink control channel, determine, based on a second DMRS pattern, the resource unit occupied by the DMRS.

With reference to the ninth possible implementation manner of the sixth aspect, in a tenth possible implementation manner of the sixth aspect, if the resource unit that is occupied by the DMRS and determined by the processor based on the second DMRS pattern overlaps with a resource unit used to transmit a second signal, the second signal is not transmitted on an overlapping resource unit.

With reference to the tenth possible implementation manner of the sixth aspect, in an eleventh possible implementation manner of the sixth aspect, the second signal includes a channel state information-reference signal or a cell-specific reference signal.

With reference to the sixth aspect, in a twelfth possible implementation manner of the sixth aspect, the transmitter is further configured to indicate the resource unit that is occupied by the DMRS and determined by the processor to the user equipment by using dynamic signaling.

With reference to the twelfth possible implementation manner of the sixth aspect, in a thirteenth possible implementation manner of the sixth aspect, the transmitter is specifically configured to indicate the resource unit occupied by the DMRS to the user equipment by using a specified information field in downlink allocation.

With reference to the thirteenth possible implementation manner of the sixth aspect, in a fourteenth possible implementation manner of the sixth aspect, the specified information field is a hybrid automatic repeat request acknowledgement resource offset field.

A technical effect of the present invention is as follows: in the present invention, in a subframe in which there is a first signal transmitted and in a subframe in which there is no first signal transmitted, different DMRS patterns are used to determine a resource unit occupied by a DMRS, or when a frequency band for transmitting a downlink channel overlaps a frequency band for transmitting a first signal and when a frequency band for transmitting a downlink channel does not overlap a frequency band for transmitting a first signal, different DMRS patterns are used to determine a resource unit occupied by a DMRS, or when a downlink channel is an EPDCCH, a preferable DMRS pattern is used to determine a resource unit occupied by a DMRS. In this way, different DMRS patterns can concurrently exist on an NCT carrier, and a DMRS pattern used for downlink transmission is determined according to priorities of different channels and/or signals in a downlink transmission process, which can ensure optimal performance of a high-priority channel and/or signal, and can further improve downlink transmission performance.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
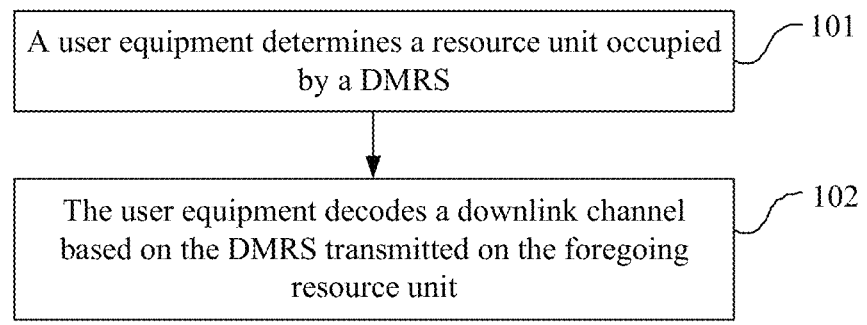
FIG. 1 is a flowchart of an embodiment of a downlink channel decoding method according to the present invention.

FIG. 1 is a flowchart of an embodiment of a downlink channel decoding method according to the present invention. As shown in FIG. 1, the downlink channel decoding method may include:

Step 101. A user equipment determines a resource unit occupied by a DMRS.

In this step, the user equipment needs to determine a resource unit occupied by a DMRS, so that the user equipment can perform channel estimation and the like based on the DMRS transmitted on the determined resource unit occupied by the DMRS, so as to decode a downlink channel.

It should be noted that in all embodiments of the present invention, the downlink channel may be any or a combination of all downlink channels in an LTE system, for example, the downlink channel may be a PDSCH or an EPDCCH. All information transmitted on the downlink channel can be generally called downlink data. Therefore, decoding a downlink channel described in all embodiments of the present invention may also be called decoding downlink data.

In an implementation manner of this embodiment, that a user equipment determines a resource unit occupied by a DMRS may be that: the user equipment determines, based on a first DMRS pattern and in a subframe in which there is a first signal transmitted, a resource unit occupied by a DMRS, and determines, based on a second DMRS pattern and in a subframe in which there is no first signal transmitted, a resource unit occupied by a DMRS, where a time domain symbol occupied by the foregoing first DMRS pattern is not completely the same as a time domain symbol occupied by the foregoing second DMRS pattern.

It should be noted that a DMRS pattern mentioned in all embodiments of the present invention refers to time domain and frequency domain locations of a resource unit occupied by a DMRS within one PRB pair, where the time domain location refers to a time domain symbol in which the resource unit occupied by the DMRS is located, and the frequency domain location refers to a subcarrier in which the resource unit occupied by the DMRS is located. Alternatively, a DMRS pattern refers to a resource unit occupied by a DMRS within one PRB pair.

In this implementation manner, the first DMRS pattern is different from the second DMRS pattern. Specifically, the time domain symbol occupied by the resource unit that is occupied by the DMRS and determined based on the first DMRS pattern is not completely the same as the time domain symbol occupied by the resource unit that is occupied by the DMRS and determined based on the second DMRS pattern. In addition, under a same DMRS antenna port, a subcarrier occupied by the resource unit that is occupied by the DMRS and determined based on the first DMRS pattern may be the same as or may be different from a subcarrier occupied by the resource unit that is occupied by the DMRS and determined based on the second DMRS pattern.

In this implementation manner, the resource unit that is occupied by the DMRS and determined based on the first DMRS pattern is located on the last two symbols of each timeslot; or the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot; or the resource unit that is occupied by the DMRS and determined based on the second DMRS pattern is located on the second symbol and the third symbol in an even timeslot, and located on the sixth symbol and the seventh symbol in an odd timeslot; or the resource unit that is occupied by the DMRS and determined based on the first DMRS pattern is located on the first symbol and the second symbol of each timeslot.

Figure 2:
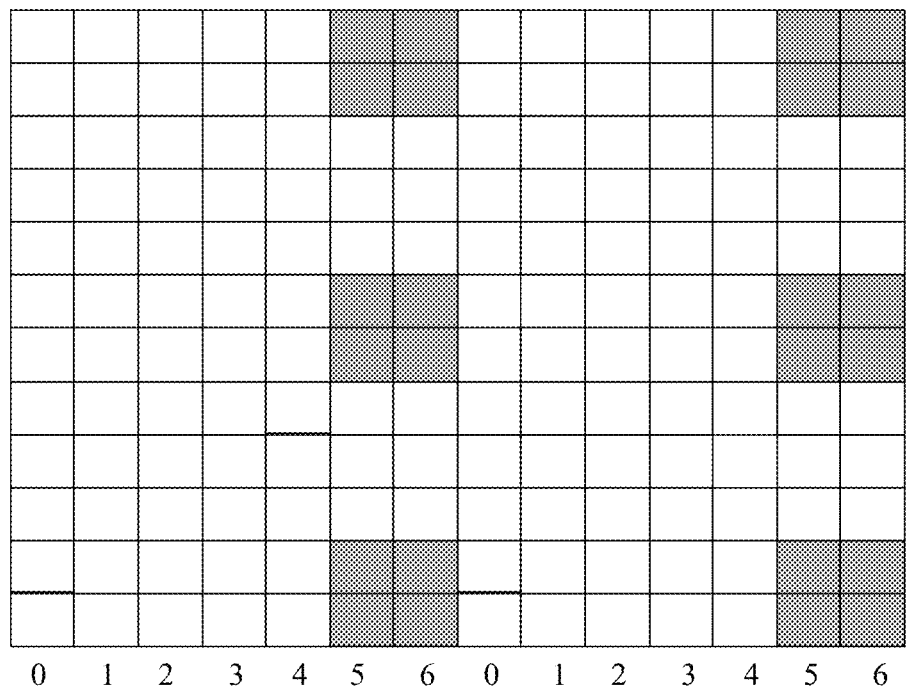
FIG. 2 is a schematic diagram of an embodiment of a first DMRS pattern according to the present invention.
Figure 3:
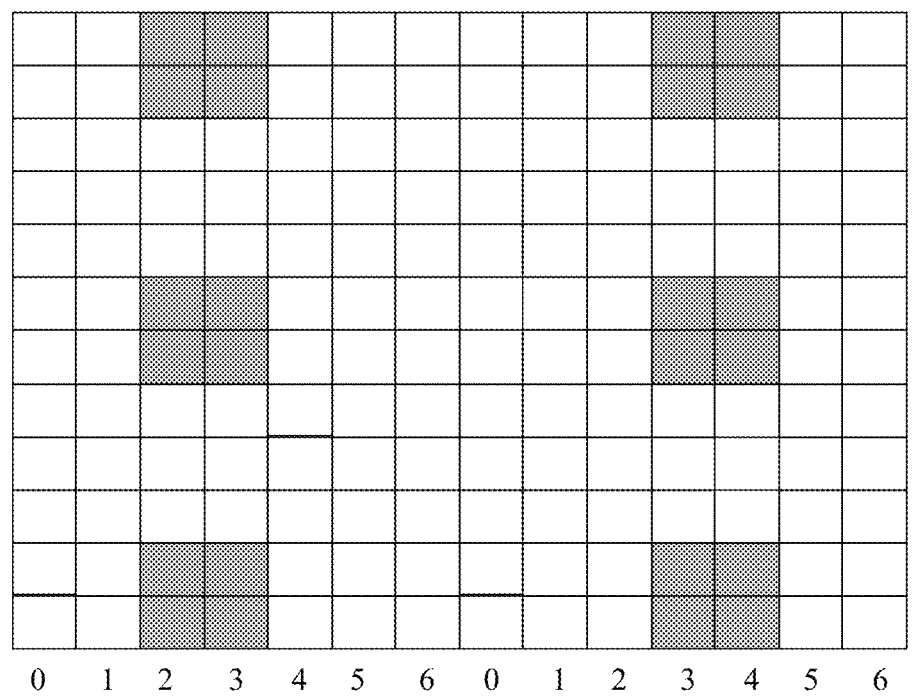
FIG. 3 is a schematic diagram of an embodiment of a second DMRS pattern according to the present invention.

For example, FIG. 2 is a schematic diagram of an embodiment of a first DMRS pattern according to the present invention, and FIG. 3 is a schematic diagram of an embodiment of a second DRMS pattern according to the present invention. A resource unit that is occupied by a DMRS and determined based on the first DMRS pattern shown in FIG. 2 is located on the last two symbols of each timeslot. A resource unit that is occupied by a DMRS and determined based on the second DMRS pattern shown in FIG. 3 is located on the third symbol and the fourth symbol of each timeslot. Shaded areas in FIG. 2 and FIG. 3 represent a location of a resource unit occupied by a DMRS.

In this implementation manner, the first signal may include one or a combination of a PSS, an SSS, a channel state information-reference signal (CSI-RS), a CRS, and a discovery reference signal (DRS). The discovery reference signal may also be called a discovery signal.

The CRS may be a reduced CRS (RCRS), that is, a CRS that is sent only on some subframes in a time domain, for example, sent once every 5 ms, and that may be sent only on a part of bandwidth or all bandwidth in a frequency domain, and only a CRS corresponding to antenna port 0 is sent.

The DRS is used for cell discovery or cell identification. The DRS may be a modified positioning reference signal (PRS), or the like.

The first signal is used as an example of a CSI-RS. This implementation manner is as follows: the user equipment determines, based on the first DMRS pattern and in a subframe in which there is a CSI-RS transmitted, a resource unit occupied by a DMRS, and determines, based on the second DMRS pattern and in a subframe in which there is no CSI-RS transmitted, a resource unit occupied by a DMRS, where the time domain symbol occupied by the foregoing first DMRS pattern is not completely the same as the time domain symbol occupied by the foregoing second DMRS pattern. The first DMRS pattern may also be a DMRS pattern corresponding to a normal subframe in LTE version 10.

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

Figure 4:
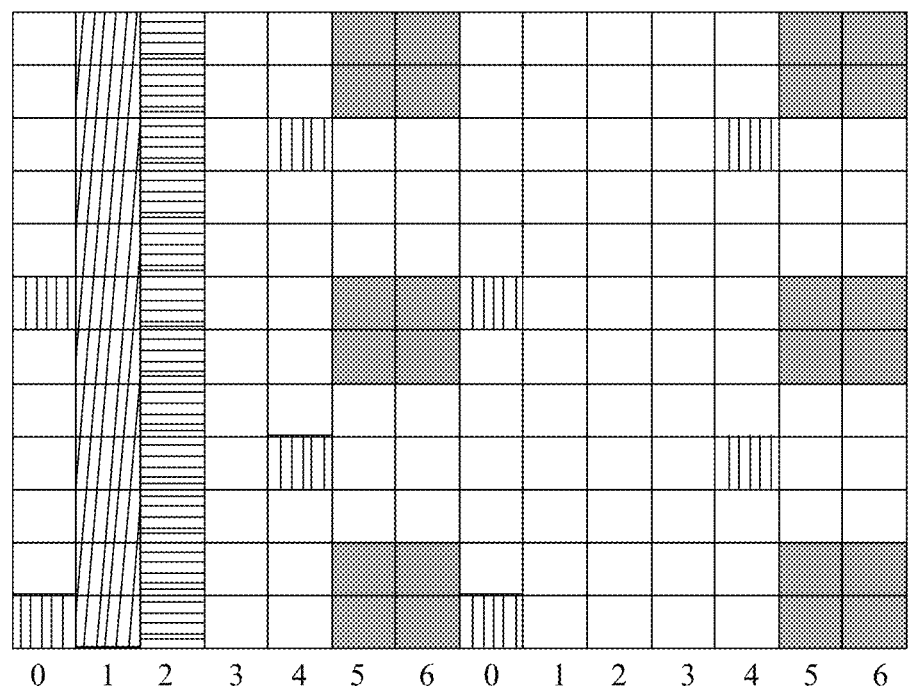
FIG. 4 is a schematic diagram of an embodiment of a location of a resource unit that is occupied by a DMRS and determined based on a first DMRS pattern, and a location of a resource unit occupied by a first signal according to the present invention.

In this implementation manner, the resource unit that is occupied by the DMRS and determined based on the first DMRS pattern does not conflict with a resource unit occupied by the first signal, for example, does not conflict with resource units/a resource unit occupied by the PSS, the SSS, and/or the CRS, and may further not conflict with a master information block (MIB), and even further, does not conflict with a resource unit occupied by a CSI-RS. FIG. 4 is a schematic diagram of an embodiment of a location of a resource unit that is occupied by a DMRS and determined based on a first DMRS pattern, and a location of a resource unit occupied by a first signal according to the present invention. To keep away from the location in which the first signal is located, the first DMRS pattern used in FIG. 4 may not be optimal for downlink channel transmission. In FIG. 4, a gray shade shows a location of the resource unit that is occupied by the DMRS and determined based on the first DMRS pattern; a slashed shade shows a location of a resource unit occupied by an SSS; a horizontal-bar shade shows a location of a resource unit occupied by a PSS; a vertical-bar shade shows a location of a resource unit occupied by a CRS.

It can be seen from FIG. 3 that when no first signal is transmitted, the resource unit that is occupied by the DMRS and determined based on the second DMRS pattern is relatively even in a time domain, which can improve transmission performance of a downlink channel.

That is, in this implementation manner, when the DMRS and the first signal need to be transmitted simultaneously, a priority of the first signal is relatively high, and therefore only a suboptimal DMRS location can be designed for decoding the downlink channel, so as to ensure transmission of important information. When no first signal is transmitted, a priority of the downlink channel is the highest. In this case, an optimal DMRS pattern can be used, thereby improving the transmission performance of the downlink channel and improving system performance.

In another implementation manner of this embodiment, that a user equipment determines a resource unit occupied by a DMRS may be that: the user equipment determines, based on a first DMRS pattern and in a subframe in which there is a first channel transmitted, a resource unit occupied by a DMRS, and determines, based on a second DMRS pattern and in a subframe in which there is no first channel transmitted, a resource unit occupied by a DMRS, where a time domain symbol occupied by the foregoing first DMRS pattern is not completely the same as a time domain symbol occupied by the foregoing second DMRS pattern.

In this implementation manner, the first DMRS pattern is different from the second DMRS pattern. Specifically, the time domain symbol occupied by the resource unit that is occupied by the DMRS and determined based on the first DMRS pattern is not completely the same as the time domain symbol occupied by the resource unit that is occupied by the DMRS and determined based on the second DMRS pattern. In addition, under a same DMRS antenna port, a subcarrier occupied by the resource unit that is occupied by the DMRS and determined based on the first DMRS pattern may be the same as or may be different from a subcarrier occupied by the resource unit that is occupied by the DMRS and determined based on the second DMRS pattern.

In this implementation manner, the resource unit that is occupied by the DMRS and determined based on the first DMRS pattern is located on the last two symbols of each timeslot; or the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot; or the resource unit that is occupied by the DMRS and determined based on the second DMRS pattern is located on the second symbol and the third symbol in an even timeslot, and located on the sixth symbol and the seventh symbol in an odd timeslot; or the resource unit that is occupied by the DMRS and determined based on the first DMRS pattern is located on the first symbol and the second symbol of each timeslot.

Likewise, in this implementation manner, the first DMRS pattern may be as shown in FIG. 2, and the second DMRS pattern may be as shown in FIG. 3.

In this implementation manner, the first channel may be a physical multicast channel (PMCH), the foregoing subframe in which there is a first channel transmitted is a multicast broadcast single frequency network (MBSFN) subframe, and the foregoing subframe in which there is no first channel transmitted is a non-MBSFN subframe. In this case, this implementation manner is as follows: the user equipment determines, based on the first DMRS pattern and in an MBSFN subframe, a resource unit occupied by a DMRS; and determines, based on the second DMRS pattern and in a non-MBSFN subframe, a resource unit occupied by a DMRS. In this implementation manner, the first channel may also be a physical broadcast channel (PBCH).

In still another implementation manner of this embodiment, that a user equipment determines a resource unit occupied by a DMRS may be that: the user equipment determines whether a frequency band used to transmit a downlink channel overlaps a frequency band used to transmit a first signal, if overlapping exists, the user equipment determines, based on a first DMRS pattern, a resource unit occupied by a DMRS, and if overlapping does not exist, the user equipment determines, based on a second DMRS pattern, a resource unit occupied by a DMRS, where a time domain symbol occupied by the foregoing first DMRS pattern is not completely the same as a time domain symbol occupied by the foregoing second DMRS pattern.

In this implementation manner, the first DMRS pattern is different from the second DMRS pattern. Specifically, the time domain symbol occupied by the resource unit that is occupied by the DMRS and determined based on the first DMRS pattern is not completely the same as the time domain symbol occupied by the resource unit that is occupied by the DMRS and determined based on the second DMRS pattern. In addition, under a same DMRS antenna port, a subcarrier occupied by the resource unit that is occupied by the DMRS and determined based on the first DMRS pattern may be the same as or may be different from a subcarrier occupied by the resource unit that is occupied by the DMRS and determined based on the second DMRS pattern.

In this implementation manner, the resource unit that is occupied by the DMRS and determined based on the first DMRS pattern is located on the last two symbols of each timeslot; or the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot; or the resource unit that is occupied by the DMRS and determined based on the second DMRS pattern is located on the second symbol and the third symbol in an even timeslot, and located on the sixth symbol and the seventh symbol in an odd timeslot; or the resource unit that is occupied by the DMRS and determined based on the first DMRS pattern is located on the first symbol and the second symbol of each timeslot.

Likewise, in this implementation manner, the first DMRS pattern may be as shown in FIG. 2, and the second DMRS pattern may be as shown in FIG. 3.

In this implementation manner, the first signal may include one or a combination of a PSS, an SSS, a CSI-RS, a CRS, and a DRS.

The CRS may be an RCRS, that is, a CRS that is sent only on some subframes in a time domain, for example, sent once every 5 ms, and that may be sent only on a part of bandwidth or all bandwidth in a frequency domain, and only a CRS corresponding to antenna port 0 is sent.

The DRS is used for cell discovery or cell identification. The DRS may be a modified PRS or the like.

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

In this implementation manner, when a frequency band for transmitting downlink data overlaps the frequency band for transmitting the first signal, a priority of the first signal is relatively high, and therefore only a suboptimal DMRS location can be designed for decoding the downlink channel, so as to ensure transmission of important information. When no first signal is transmitted, a priority of the downlink data is the highest. In this case, an optimal DMRS pattern can be used, thereby improving transmission performance of the downlink data and improving system performance.

In yet another implementation manner of this embodiment, that a user equipment determines a resource unit occupied by a DMRS may be that: if a downlink channel is a PDSCH, the user equipment determines, based on a first DMRS pattern, a resource unit occupied by a DMRS, and if a downlink channel is an EPDCCH, the user equipment determines, based on a second DMRS pattern, a resource unit occupied by a DMRS. That is, in this implementation manner, when the user equipment needs to receive a PDSCH, that is, when the downlink channel to be received by the user equipment is a PDSCH, the user equipment determines, based on the first DMRS pattern, a resource unit occupied by a DMRS, and when the user equipment needs to receive an EPDCCH, that is, when the downlink channel to be received by the user equipment is an EPDCCH, the user equipment determines, based on the second DMRS pattern, a resource unit occupied by a DMRS.

In this implementation manner, if the resource unit that is occupied by the DMRS and determined based on the second DMRS pattern overlaps a resource unit used to transmit a second signal, the second signal is not transmitted on an overlapping resource unit. The foregoing second signal may be a CSI-RS or a CRS.

In this implementation manner, the EPDCCH carries control information and has a high performance requirement, and in addition, there may be no PDSCH transmitted on a frequency band used to transmit the EPDCCH. Therefore, in this case, it can be considered that a priority of the EPDCCH is relatively high and the DMRS is transmitted by using the preferable second DMRS pattern, so as to ensure performance of the EPDCCH. If the resource unit that is occupied by the DMRS and determined based on the second DMRS pattern conflicts with the resource unit occupied by the second signal, the second signal is not transmitted, which can ensure transmission performance of information with a higher priority and improve system performance.

In still yet another implementation manner of this embodiment, that a user equipment determines a resource unit occupied by a DMRS may be that: the user equipment determines, based on dynamic signaling, a resource unit occupied by a DMRS.

In this implementation manner, a base station may first semi-statically configure multiple usable DMRS patterns for the user equipment, and then notifies, by using the dynamic signaling, the user equipment of a DMRS pattern corresponding to current downlink data transmission. In this way, the user equipment can determine, based on the dynamic signaling, a resource unit occupied by a DMRS.

The foregoing multiple DMRS patterns that can be used by the user equipment may also be multiple pre-defined patterns.

In this implementation manner, the dynamic signaling may be a PDCCH or an EPDCCH. Specifically, a specified information field in the PDCCH or the EPDCCH may be used to indicate a DMRS pattern corresponding to current downlink channel transmission. The foregoing specified information field may be a hybrid automatic repeat request acknowledgement resource offset (HARQ-ACK resource offset) field, that is, this field is reused for indication. Alternatively, in this implementation manner, the user equipment may determine, based on a specified information field in downlink allocation, a resource unit occupied by a DMRS, where the foregoing specified information field may be a hybrid automatic repeat request acknowledgement resource offset field.

In this implementation manner, the user equipment may select an optimal DMRS pattern according to an actual situation, to determine a resource unit occupied by a DMRS, thereby improving transmission performance of downlink data.

Step 102. The user equipment decodes a downlink channel based on the DMRS transmitted on the foregoing resource unit.

In this step, the user equipment performs channel estimation and the like based on the DMRS transmitted on the resource unit that is occupied by the DMRS and determined in step 101, thereby decoding the downlink channel or the downlink data. The downlink channel herein may refer to a downlink channel demodulated based on a DMRS, for example, a PDSCH or an EPDCCH, or may refer to a PBCH, an enhanced physical broadcast channel (EPBCH), or the like.

Specifically, this step may also be that the user equipment receives the downlink channel or the downlink data based on the DMRS transmitted on the resource unit that is occupied by the DMRS and determined in step 101, or that the user equipment demodulates the downlink channel or the downlink data based on the DMRS transmitted on the resource unit that is occupied by the DMRS and determined in step 101.

In the foregoing embodiment, in a subframe in which there is a first signal transmitted and in a subframe in which there is no first signal transmitted, different DMRS patterns are used to determine a resource unit occupied by a DMRS, or when a frequency band for transmitting a downlink channel overlaps a frequency band for transmitting a first signal and when a frequency band for transmitting a downlink channel does not overlap a frequency band for transmitting a first signal, different DMRS patterns are used to determine a resource unit occupied by a DMRS, or when a downlink channel is an EPDCCH, a DMRS pattern with a higher priority is preferably used to determine a resource unit occupied by a DMRS. In this way, different DMRS patterns can concurrently exist on an NCT carrier, and a DMRS pattern used for downlink transmission is determined according to priorities of different channels and/or signals in a downlink transmission process, which can ensure optimal performance of a high-priority channel and/or signal, and can further improve downlink transmission performance.

Figure 5:
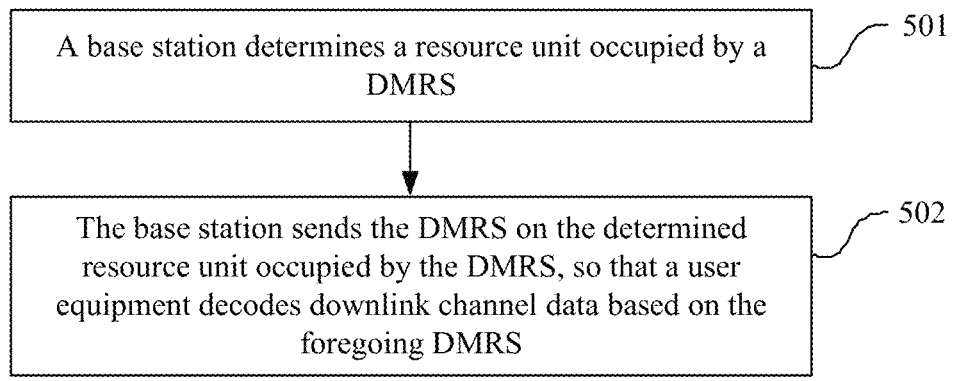
FIG. 5 is a flowchart of another embodiment of a downlink information transmission method according to the present invention.

FIG. 5 is a flowchart of another embodiment of a downlink information transmission method according to the present invention. As shown in FIG. 5, the downlink information transmission method may include:

Step 501. A base station determines a resource unit occupied by a DMRS.

In an implementation manner of this embodiment, that a base station determines a resource unit occupied by a demodulation reference signal DMRS may be that: the base station determines, based on a first DMRS pattern and in a subframe in which there is a first signal transmitted, a resource unit occupied by a DMRS, and determines, based on a second DMRS pattern and in a subframe in which there is no first signal transmitted, a resource unit occupied by a DMRS, where a time domain symbol occupied by the foregoing first DMRS pattern is not completely the same as a time domain symbol occupied by the second DMRS pattern.

It should be noted that a DMRS pattern mentioned in this embodiment refers to time domain and frequency domain locations of a resource unit occupied by a DMRS within one PRB pair, where the time domain location refers to a time domain symbol in which the resource unit occupied by the DMRS is located, and the frequency domain location refers to a subcarrier in which the resource unit occupied by the DMRS is located. Alternatively, a DMRS pattern refers to a resource unit occupied by a DMRS within one PRB pair.

In this implementation manner, the first DMRS pattern is different from the second DMRS pattern. Specifically, the time domain symbol occupied by the resource unit that is occupied by the DMRS and determined based on the first DMRS pattern is not completely the same as the time domain symbol occupied by the resource unit that is occupied by the DMRS and determined based on the second DMRS pattern. In addition, under a same DMRS antenna port, a subcarrier occupied by the resource unit that is occupied by the DMRS and determined based on the first DMRS pattern may be the same as or may be different from a subcarrier occupied by the resource unit that is occupied by the DMRS and determined based on the second DMRS pattern.

In this implementation manner, the resource unit that is occupied by the DMRS and determined based on the first DMRS pattern is located on the last two symbols of each timeslot; or the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot; or the resource unit that is occupied by the DMRS and determined based on the second DMRS pattern is located on the second symbol and the third symbol in an even timeslot, and located on the sixth symbol and the seventh symbol in an odd timeslot; or the resource unit that is occupied by the DMRS and determined based on the first DMRS pattern is located on the first symbol and the second symbol of each timeslot.

For example, the first DMRS pattern may be as shown in FIG. 2, and the second DMRS pattern may be as shown in FIG. 3.

In this implementation manner, the first signal may include one or a combination of a PSS, an SSS, a CSI-RS, a CRS, and a DRS.

The CRS may be an RCRS, that is, a CRS that is sent only on some subframes in a time domain, for example, sent once every 5 ms, and that may be sent only on a part of bandwidth or all bandwidth in a frequency domain, and only a CRS corresponding to antenna port 0 is sent.

The DRS is used for cell discovery or cell identification. The DRS may be a modified PRS or the like.

The first signal is used as an example of a CSI-RS. This implementation manner is as follows: the base station determines, based on the first DMRS pattern and in a subframe in which there is a CSI-RS transmitted, a resource unit occupied by a DMRS, and determines, based on the second DMRS pattern and in a subframe in which there is no CSI-RS transmitted, a resource unit occupied by a DMRS, where the time domain symbol occupied by the foregoing first DMRS pattern is not completely the same as the time domain symbol occupied by the foregoing second DMRS pattern. The first DMRS pattern may also be a DMRS pattern corresponding to a normal subframe in LTE version 10.

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

In this implementation manner, the resource unit that is occupied by the DMRS and determined based on the first DMRS pattern does not conflict with a resource unit occupied by the first signal, for example, does not conflict with resource units/a resource unit occupied by the PSS, the SSS, and/or the CRS, and may further not conflict with an MIB, and even further, does not conflict with a resource unit occupied by a CSI-RS. FIG. 4 shows a location of a resource unit that is occupied by a DMRS and determined based on a first DMRS pattern, and a location of a resource unit occupied by a first signal. To keep away from the location in which the first signal is located, the first DMRS pattern used in FIG. 4 may not be optimal for downlink data transmission.

It can be seen from FIG. 3 that when no first signal is transmitted, the resource unit that is occupied by the DMRS and determined based on the second DMRS pattern is relatively even in a time domain, which can improve transmission performance of downlink data.

That is, in this implementation manner, when the DMRS and the first signal need to be transmitted simultaneously, a priority of the first signal is relatively high, and therefore only a suboptimal DMRS location can be designed for decoding the downlink data, so as to ensure transmission of important information. When no first signal is transmitted, a priority of the downlink data is the highest. In this case, an optimal DMRS pattern can be used, thereby improving transmission performance of the downlink data and improving system performance.

In another implementation manner of this embodiment, that a base station determines a resource unit occupied by a DMRS may be that: the base station determines, based on a first DMRS pattern and in a subframe in which there is a first channel transmitted, a resource unit occupied by a DMRS, and determines, based on a second DMRS pattern and in a subframe in which there is no first channel transmitted, a resource unit occupied by a DMRS, where a time domain symbol occupied by the foregoing first DMRS pattern is not completely the same as a time domain symbol occupied by the foregoing second DMRS pattern.

In this implementation manner, the first DMRS pattern is different from the second DMRS pattern. Specifically, the time domain symbol occupied by the resource unit that is occupied by the DMRS and determined based on the first DMRS pattern is not completely the same as the time domain symbol occupied by the resource unit that is occupied by the DMRS and determined based on the second DMRS pattern. In addition, under a same DMRS antenna port, a subcarrier occupied by the resource unit that is occupied by the DMRS and determined based on the first DMRS pattern may be the same as or may be different from a subcarrier occupied by the resource unit that is occupied by the DMRS and determined based on the second DMRS pattern.

In this implementation manner, the resource unit that is occupied by the DMRS and determined based on the first DMRS pattern is located on the last two symbols of each timeslot; or the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot; or the resource unit that is occupied by the DMRS and determined based on the second DMRS pattern is located on the second symbol and the third symbol in an even timeslot, and located on the sixth symbol and the seventh symbol in an odd timeslot; or the resource unit that is occupied by the DMRS and determined based on the first DMRS pattern is located on the first symbol and the second symbol of each timeslot.

Likewise, in this implementation manner, the first DMRS pattern may be as shown in FIG. 2, and the second DMRS pattern may be as shown in FIG. 3.

In this implementation manner, the first channel may be a PMCH, the foregoing subframe in which there is a first channel transmitted is an MBSFN subframe, and the foregoing subframe in which there is no first channel transmitted is a non-MBSFN subframe. In this case, this implementation manner is as follows: the base station determines, based on the first DMRS pattern and in an MBSFN subframe, a resource unit occupied by a DMRS, and determines, based on the second DMRS pattern and in a non-MBSFN subframe, a resource unit occupied by a DMRS. In this implementation manner, the first channel may also be a PBCH.

In still another implementation manner of this embodiment, that a base station determines a resource unit occupied by a DMRS may be that: the base station determines whether a frequency band used to transmit a downlink channel overlaps a frequency band used to transmit a first signal, if overlapping exists, the foregoing base station determines, based on a first DMRS pattern, a resource unit occupied by a DMRS, and if overlapping does not exist, the foregoing base station determines, based on a second DMRS pattern, a resource unit occupied by a DMRS, where a time domain symbol occupied by the first DMRS pattern is not completely the same as a time domain symbol occupied by the second DMRS pattern.

In this implementation manner, the first DMRS pattern is different from the second DMRS pattern. Specifically, the time domain symbol occupied by the resource unit that is occupied by the DMRS and determined based on the first DMRS pattern is not completely the same as the time domain symbol occupied by the resource unit that is occupied by the DMRS and determined based on the second DMRS pattern. In addition, under a same DMRS antenna port, a subcarrier occupied by the resource unit that is occupied by the DMRS and determined based on the first DMRS pattern may be the same as or may be different from a subcarrier occupied by the resource unit that is occupied by the DMRS and determined based on the second DMRS pattern.

In this implementation manner, the resource unit that is occupied by the DMRS and determined based on the first DMRS pattern is located on the last two symbols of each timeslot; or the resource unit that is occupied by the DMRS and determined based on the first DMRS pattern is located on the last two symbols of each timeslot, and the resource unit that is occupied by the DMRS and determined based on the second DMRS pattern is located on the third symbol and the fourth symbol of each timeslot; or the resource unit that is occupied by the DMRS and determined based on the second DMRS pattern is located on the second symbol and the third symbol in an even timeslot, and located on the sixth symbol and the seventh symbol in an odd timeslot; or the resource unit that is occupied by the DMRS and determined based on the first DMRS pattern is located on the first symbol and the second symbol of each timeslot.

Likewise, in this implementation manner, the first DMRS pattern may be as shown in FIG. 2, and the second DMRS pattern may be as shown in FIG. 3.

In this implementation manner, the first signal may include one or a combination of a PSS, an SSS, a CSI-RS, a CRS, and a DRS.

The CRS may be an RCRS, that is, a CRS that is sent only on some subframes in a time domain, for example, sent once every 5 ms, and that may be sent only on a part of bandwidth or all bandwidth in a frequency domain, and only a CRS corresponding to antenna port 0 is sent.

The DRS is used for cell discovery or cell identification. The DRS may be a modified PRS or the like.

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

In this implementation manner, when a frequency band for transmitting downlink data overlaps the frequency band for transmitting the first signal, a priority of the first signal is relatively high, and therefore only a suboptimal DMRS location can be designed for decoding the downlink channel, so as to ensure transmission of important information. When no first signal is transmitted, a priority of the downlink data is the highest. In this case, an optimal DMRS pattern can be used, thereby improving transmission performance of the downlink data and improving system performance.

In yet another implementation manner of this embodiment, that a base station determines a resource unit occupied by a DMRS may be that: if a downlink channel is a PDSCH, the base station determines, based on a first DMRS pattern, a resource unit occupied by a DMRS, and if a downlink channel is an EPDCCH, the base station determines, based on a second DMRS pattern, a resource unit occupied by a DMRS. That is, in this implementation manner, when the base station needs to send a PDSCH, that is, when the downlink channel to be sent by the base station is a PDSCH, the base station determines, based on the first DMRS pattern, a resource unit occupied by a DMRS, and when the base station needs to send an EPDCCH, that is, when the downlink channel to be sent by the base station is an EPDCCH, the base station determines, based on the second DMRS pattern, a resource unit occupied by a DMRS.

In this implementation manner, if the resource unit that is occupied by the DMRS and determined based on the second DMRS pattern overlaps a resource unit used to transmit a second signal, the second signal is not transmitted on an overlapping resource unit. The foregoing second signal may be a CSI-RS or a CRS.

In this implementation manner, the EPDCCH carries control information and has a high performance requirement, and in addition, there may be no PDSCH transmitted on a frequency band used to transmit the EPDCCH. Therefore, in this case, it can be considered that a priority of the EPDCCH is relatively high and the DMRS is transmitted by using the preferable second DMRS pattern, so as to ensure performance of the EPDCCH. If the resource unit that is occupied by the DMRS and determined based on the second DMRS pattern conflicts with the resource unit occupied by the second signal, the second signal is not transmitted, which can ensure transmission performance of information with a higher priority and improve system performance.

In still yet another implementation manner of this embodiment, after step 501, the base station indicates, by using dynamic signaling, the foregoing resource unit occupied by the DMRS to a user equipment, so that the user equipment determines, based on the dynamic signaling, a resource unit occupied by a DMRS.

It should be noted that this step is not mandatory. A base station side needs to execute this step only when a user equipment side also determines, based on dynamic signaling, a resource unit occupied by a DMRS.

The foregoing dynamic signaling may be a PDCCH or an EPDCCH. Specifically, a specified information field in the PDCCH or the EPDCCH may be used to indicate a DMRS pattern corresponding to a current downlink channel. The foregoing specified information field may be a hybrid automatic repeat request acknowledgement resource offset field, that is, the field is reused for indication. Alternatively, in this implementation manner, the base station may indicate the foregoing resource unit occupied by the DMRS to a user equipment by using a specified information field in downlink allocation, where the foregoing specified information field may be a hybrid automatic repeat request acknowledgement resource offset field.

Step 502. The base station sends the DMRS on the determined resource unit occupied by the DMRS, so that a user equipment decodes downlink channel data based on the foregoing DMRS.

In this step, the base station transmits the DMRS on the determined resource unit occupied by the DMRS, so that the user equipment decodes, receives, or demodulates a downlink channel or downlink data based on the DMRS. The downlink channel herein may refer to a downlink channel demodulated based on a DMRS, for example, a PDSCH or an EPDCCH, or may refer to a PBCH, an EPBCH, or the like.

In the foregoing embodiment, in a subframe in which there is a first signal transmitted and in a subframe in which there is no first signal transmitted, different DMRS patterns are used to determine a resource unit occupied by a DMRS, or when a frequency band for transmitting downlink channel data overlaps a frequency band for transmitting a first signal and when a frequency band for transmitting downlink channel data does not overlap a frequency band for transmitting a first signal, different DMRS patterns are used to determine a resource unit occupied by a DMRS, or when downlink channel data is EPDCCH data, a DMRS pattern with a higher priority is used to determine a resource unit occupied by a DMRS. In this way, different DMRS patterns can concurrently exist on an NCT carrier, and a DMRS pattern used for downlink transmission is determined according to priorities of different channels and/or signals in a downlink transmission process, which can ensure optimal performance of a high-priority channel and/or signal, and can further improve downlink transmission performance.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Figure 6:
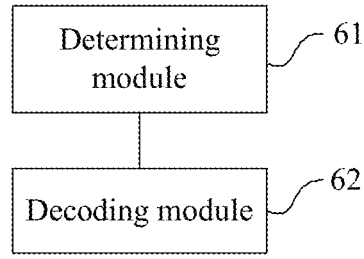
FIG. 6 is a schematic structural diagram of an embodiment of a user equipment according to the present invention.

FIG. 6 is a schematic structural diagram of an embodiment of a user equipment according to the present invention. The user equipment in this embodiment may implement the procedure of the embodiment shown in FIG. 1 of the present invention. As shown in FIG. 6, the user equipment may include: a determining module 61 and a decoding module 62, where the determining module 61 is configured to determine a resource unit occupied by a DMRS; and the decoding module 62 is configured to decode a downlink channel based on the DMRS transmitted on the resource unit determined by the determining module 61.

In an implementation manner of this embodiment, the determining module 61 is specifically configured to: determine, based on a first DMRS pattern and in a subframe in which there is a first signal transmitted, a resource unit occupied by a DMRS, and determine, based on a second DMRS pattern and in a subframe in which there is no first signal transmitted, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS. The discovery reference signal may also be called a discovery signal (Discovery Signal).

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

In another implementation manner of this embodiment, the determining module 61 is specifically configured to: determine, based on a first DMRS pattern and in a subframe in which there is a first channel transmitted, a resource unit occupied by a DMRS, and determine, based on a second DMRS pattern and in a subframe in which there is no first channel transmitted, a resource unit occupied by a DMRS, where a time domain symbol occupied by the foregoing first DMRS pattern is not completely the same as a time domain symbol occupied by the foregoing second DMRS pattern.

In this implementation manner, the first channel may be a PMCH, the foregoing subframe in which there is a first channel transmitted is an MBSFN subframe, and the foregoing subframe in which there is no first channel transmitted is a non-MBSFN subframe.

In still another implementation manner of this embodiment, the determining module 61 is specifically configured to: determine whether a frequency band used to transmit the downlink channel overlaps a frequency band used to transmit a first signal, if overlapping exists, determine, based on a first DMRS pattern, a resource unit occupied by a DMRS, and if overlapping does not exist, determine, based on a second DMRS pattern, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS. The discovery reference signal may also be called a discovery signal (Discovery Signal).

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

In the foregoing three implementation manners of this embodiment, the resource unit that is occupied by the DMRS and determined by the determining module 61 based on the first DMRS pattern is located on the last two symbols of each timeslot; or the resource unit that is occupied by the DMRS and determined by the determining module 61 based on the first DMRS pattern is located on the last two symbols of each timeslot, and the resource unit that is occupied by the DMRS and determined by the determining module 61 based on the second DMRS pattern is located on the third symbol and the fourth symbol of each timeslot; or the resource unit that is occupied by the DMRS and determined by the determining module 61 based on the second DMRS pattern is located on the second symbol and the third symbol in an even timeslot, and located on the sixth symbol and the seventh symbol in an odd timeslot; or the resource unit that is occupied by the DMRS and determined by the determining module 61 based on the first DMRS pattern is located on the first symbol and the second symbol of each timeslot.

In yet another implementation manner of this embodiment, the determining module 61 is specifically configured to: when the downlink channel is a PDSCH, determine, based on a first DMRS pattern, a resource unit occupied by a DMRS, and when the downlink channel is an EPDCCH, determine, based on a second DMRS pattern, a resource unit occupied by a DMRS.

In this implementation manner, if the resource unit that is occupied by the DMRS and determined by the determining module 61 based on the second DMRS pattern overlaps a resource unit used to transmit a second signal, the second signal is not transmitted on an overlapping resource unit.

The foregoing second signal includes a CSI-RS or a CRS.

In still yet another implementation manner of this embodiment, the determining module 61 is specifically configured to determine, based on dynamic signaling, a resource unit occupied by a DMRS. In this implementation manner, the dynamic signaling may be a PDCCH or an EPDCCH. Specifically, a specified information field in the PDCCH or the EPDCCH may be used to indicate a DMRS pattern corresponding to current downlink channel transmission. The foregoing specified information field may be a hybrid automatic repeat request acknowledgement resource offset field, that is, this field is reused for indication. Alternatively, in this implementation manner, the determining module 61 may determine, based on a specified information field in downlink allocation, a resource unit occupied by a DMRS, where the foregoing specified information field may be a hybrid automatic repeat request acknowledgement resource offset field.

In hardware implementation, the foregoing determining module 61 and decoding module 62 may be embedded in or independent of a processor of the user equipment in a hardware form, or may be stored in a memory of the user equipment in a software form, so as to be called by the processor to execute operations corresponding to the foregoing modules. The processor may be a central processing unit (CPU), a microprocessor, a single-chip microcomputer, or the like.

It should be noted that the user equipment shown in FIG. 6 may be configured to implement the method provided in the embodiment shown in FIG. 1 of the present invention, and descriptions about the first pattern, the second pattern, the first channel, the first signal, the second signal, and the like are the same as those in the foregoing method embodiment, and are not described herein again.

The foregoing user equipment uses, in a subframe in which there is a first signal transmitted and in a subframe in which there is no first signal transmitted, different DMRS patterns to determine a resource unit occupied by a DMRS, or when a frequency band for transmitting a downlink channel overlaps a frequency band for transmitting a first signal and when a frequency band for transmitting a downlink channel does not overlap a frequency band for transmitting a first signal, uses different DMRS patterns to determine a resource unit occupied by a DMRS, or when a downlink channel is an EPDCCH, uses a DMRS pattern with a relatively high priority to determine a resource unit occupied by a DMRS. In this way, different DMRS patterns can concurrently exist on an NCT carrier, and a DMRS pattern used for downlink transmission is determined according to priorities of different channels and/or signals in a downlink transmission process, which can ensure optimal performance of a high-priority channel and/or signal, and can further improve downlink transmission performance.

Figure 7:
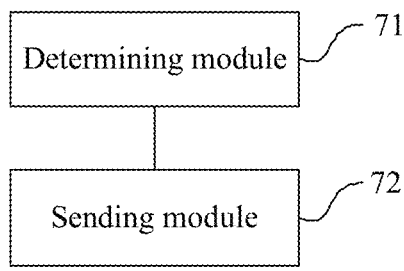
FIG. 7 is a schematic structural diagram of an embodiment of a base station according to the present invention.

FIG. 7 is a schematic structural diagram of an embodiment of a base station according to the present invention. The base station in this embodiment may implement the method provided in the embodiment shown in FIG. 5 of the present invention. As shown in FIG. 7, the base station may include: a determining module 71 and a sending module 72, where the determining module 71 is configured to determine a resource unit occupied by a DMRS; and the sending module 72 is configured to send the DMRS on the resource unit that is occupied by the DMRS and determined by the determining module 71, so that a user equipment decodes a downlink channel based on the foregoing DMRS.

In an implementation manner of this embodiment, the determining module 71 is specifically configured to: determine, based on a first DMRS pattern and in a subframe in which there is a first signal transmitted, a resource unit occupied by a DMRS, and determine, based on a second DMRS pattern and in a subframe in which there is no first signal transmitted, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS.

In this implementation manner, both the foregoing subframe in which there is a first signal transmitted and the foregoing subframe in which there is no first signal transmitted belong to normal subframes, or both the foregoing subframe in which there is a first signal transmitted and the foregoing subframe in which there is no first signal transmitted belong to special subframes.

In another implementation manner of this embodiment, the determining module 71 is specifically configured to: determine, based on a first DMRS pattern and in a subframe in which there is a first channel transmitted, a resource unit occupied by a DMRS, and determine, based on a second DMRS pattern and in a subframe in which there is no first channel transmitted, a resource unit occupied by a DMRS, where a time domain symbol occupied by the foregoing first DMRS pattern is not completely the same as a time domain symbol occupied by the foregoing second DMRS pattern.

In this implementation manner, the foregoing first channel is a PMCH, the foregoing subframe in which there is a first channel transmitted is an MBSFN subframe, and the foregoing subframe in which there is no first channel transmitted is a non-MBSFN subframe.

In still another implementation manner of this embodiment, the determining module 71 is specifically configured to: determine whether a frequency band used to transmit the downlink channel overlaps a frequency band for transmitting a first signal, if overlapping exists, determine, based on a first DMRS pattern, a resource unit occupied by a DMRS, and if overlapping does not exist, determine, based on a second DMRS pattern, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS.

In this implementation manner, both the foregoing subframe in which there is a first signal transmitted and the foregoing subframe in which there is no first signal transmitted belong to normal subframes, or both the foregoing subframe in which there is a first signal transmitted and the foregoing subframe in which there is no first signal transmitted belong to special subframes.

In the foregoing three implementation manners of this embodiment, the resource unit that is occupied by the DMRS and determined by the determining module 71 based on the first DMRS pattern is located on the last two symbols of each timeslot; or the resource unit that is occupied by the DMRS and determined by the determining module 71 based on the first DMRS pattern is located on the last two symbols of each timeslot, and the resource unit that is occupied by the DMRS and determined by the determining module 71 based on the second DMRS pattern is located on the third symbol and the fourth symbol of each timeslot; or the resource unit that is occupied by the DMRS and determined by the determining module 71 based on the second DMRS pattern is located on the second symbol and the third symbol in an even timeslot, and located on the sixth symbol and the seventh symbol in an odd timeslot; or the resource unit that is occupied by the DMRS and determined by the determining module 71 based on the first DMRS pattern is located on the first symbol and the second symbol of each timeslot.

In yet another implementation manner of this embodiment, the determining module 71 is specifically configured to: when the foregoing downlink channel is a PDSCH, determine, based on a first DMRS pattern, a resource unit occupied by a DMRS, and when the foregoing downlink channel is an EPDCCH, determine, based on a second DMRS pattern, a resource unit occupied by a DMRS.

In this implementation manner, if the resource unit that is occupied by the DMRS and determined by the determining module 71 based on the second DMRS pattern overlaps a resource unit used to transmit a second signal, the second signal is not transmitted on an overlapping resource unit.

The foregoing second signal includes a CSI-RS or a CRS.

In still yet another implementation manner of this embodiment, the sending module 72 is further configured to indicate, by using dynamic signaling, the resource unit that is occupied by the DMRS and determined by the determining module 71 to the foregoing user equipment.

The foregoing dynamic signaling may be a PDCCH or an EPDCCH. Specifically, a specified information field in the PDCCH or the EPDCCH may be used to indicate a DMRS pattern corresponding to a current downlink channel. The foregoing specified information field may be a hybrid automatic repeat request acknowledgement resource offset field, that is, this field is reused for indication. Alternatively, in this implementation manner, the sending module 72 may indicate the foregoing resource unit occupied by the DMRS to the user equipment by using a specified information field in downlink allocation, where the foregoing specified information field may be a hybrid automatic repeat request acknowledgement resource offset field.

In hardware implementation, the foregoing sending module 72 may be a transmitter or a receiver; the foregoing determining module 71 may be embedded in or independent of a processor of the base station in a hardware form, or may be stored in a memory of the base station in a software form, so as to be called the processor to execute operations corresponding to the foregoing modules. The processor may be a central processing unit (CPU), a microprocessor, a single-chip microcomputer, or the like.

It should be noted that the base station shown in FIG. 7 may be configured to implement the method provided in the embodiment shown in FIG. 5 of the present invention, and descriptions about the first pattern, the second pattern, the first channel, the first signal, the second signal, and the like are the same as those in the foregoing method embodiment, and are not described herein again.

In the foregoing embodiment, in a subframe in which there is a first signal transmitted and in a subframe in which there is no first signal transmitted, different DMRS patterns are used to determine a resource unit occupied by a DMRS, or when a frequency band for transmitting downlink channel data overlaps a frequency band for transmitting a first signal and when a frequency band for transmitting downlink channel data does not overlap a frequency band for transmitting a first signal, different DMRS patterns are used to determine a resource unit occupied by a DMRS, or when downlink channel data is EPDCCH data, a DMRS pattern with a higher priority is used to determine a resource unit occupied by a DMRS. In this way, different DMRS patterns can concurrently exist on an NCT carrier, and a DMRS pattern used for downlink transmission is determined according to priorities of different channels and/or signals in a downlink transmission process, which can ensure optimal performance of a high-priority channel and/or signal, and can further improve downlink transmission performance.

Figure 8:
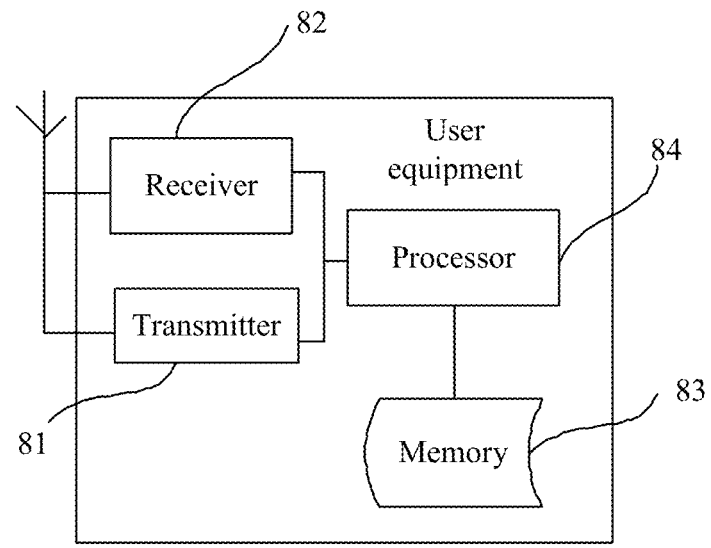
FIG. 8 is a schematic structural diagram of another embodiment of a user equipment according to the present invention.

FIG. 8 is a schematic structural diagram of another embodiment of a user equipment according to the present invention. As shown in FIG. 8, the user equipment may include a transmitter 81, a receiver 82, a memory 83, and a processor 84 that is connected to the transmitter 81, the receiver 82, and the memory 83 separately. Certainly, the user equipment may further include general components such as an antenna, a baseband processing component, an intermediate radio frequency processing component, and an input/output apparatus, and this embodiment of the present invention set no limitation thereto.

The memory 83 is configured to store a group of program code.

The processor 84 is configured to call the program code stored in the memory to execute the following operations: determining a resource unit occupied by a demodulation reference signal DMRS; and decoding a downlink channel based on the DMRS transmitted on the foregoing resource unit.

In an implementation manner of this embodiment, the processor 84 is specifically configured to: determine, based on a first DMRS pattern and in a subframe in which there is a first signal transmitted, a resource unit occupied by a DMRS, and determine, based on a second DMRS pattern and in a subframe in which there is no first signal transmitted, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS. The discovery reference signal may also be called a discovery signal (Discovery Signal).

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

In another implementation manner of this embodiment, that the processor 84 is configured to determine a resource unit occupied by a DMRS may be that: the processor 84 is specifically configured to: determine, based on a first DMRS pattern and in a subframe in which there is a first channel transmitted, a resource unit occupied by a DMRS, and determine, based on a second DMRS pattern and in a subframe in which there is no first channel transmitted, a resource unit occupied by a DMRS, where a time domain symbol occupied by the foregoing first DMRS pattern is not completely the same as a time domain symbol occupied by the foregoing second DMRS pattern.

In this implementation manner, the first channel may be a PMCH, the foregoing subframe in which there is a first channel transmitted is an MBSFN subframe, and the foregoing subframe in which there is no first channel transmitted is a non-MBSFN subframe.

In still another implementation manner of this embodiment, that the processor 84 is configured to determine a resource unit occupied by a DMRS may be that: the processor 84 is specifically configured to: determine whether a frequency band used to transmit the downlink channel overlaps a frequency band used to transmit a first signal, if overlapping exists, determine, based on a first DMRS pattern, a resource unit occupied by a DMRS, and if overlapping does not exist, determine, based on a second DMRS pattern, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS. The discovery reference signal may also be called a discovery signal (Discovery Signal).

In this implementation manner, both the subframe in which there is a first signal transmitted and the subframe in which there is no first signal transmitted belong to normal subframes, or both the subframe in which there is a first signal transmitted and the subframe in which there is no first signal transmitted belong to special subframes.

In the foregoing three implementation manners of this embodiment, the resource unit that is occupied by the DMRS and determined by the processor 84 based on the first DMRS pattern is located on the last two symbols of each timeslot; or the resource unit that is occupied by the DMRS and determined by the processor 84 based on the first DMRS pattern is located on the last two symbols of each timeslot, and the resource unit that is occupied by the DMRS and determined by the processor 84 based on the second DMRS pattern is located on the third symbol and the fourth symbol of each timeslot; or the resource unit that is occupied by the DMRS and determined by the processor 84 based on the second DMRS pattern is located on the second symbol and the third symbol in an even timeslot, and located on the sixth symbol and the seventh symbol in an odd timeslot; or the resource unit that is occupied by the DMRS and determined by the processor 84 based on the first DMRS pattern is located on the first symbol and the second symbol of each timeslot.

In yet another implementation manner of this embodiment, that the processor 84 is configured to determine a resource unit occupied by a DMRS may be that: the processor 84 is specifically configured to: when the foregoing downlink channel is a PDSCH, determine, based on a first DMRS pattern, a resource unit occupied by a DMRS, and when the foregoing downlink channel is an EPDCCH, determine, based on a second DMRS pattern, a resource unit occupied by a DMRS.

In this implementation manner, if the resource unit that is occupied by the DMRS and determined by the processor 84 based on the second DMRS pattern overlaps a resource unit used to transmit a second signal, the second signal is not transmitted on an overlapping resource unit.

The foregoing second signal includes a CSI-RS or a CRS.

In still yet another implementation manner of this embodiment, that the processor 84 is configured to determine a resource unit occupied by a DMRS may be that: the processor 84 is specifically configured to determine, based on dynamic signaling, a resource unit occupied by a DMRS. In this implementation manner, the dynamic signaling may be a PDCCH or an EPDCCH. Specifically, a specified information field in the PDCCH or the EPDCCH may be used to indicate a DMRS pattern corresponding to current downlink channel transmission. The foregoing specified information field may be a hybrid automatic repeat request acknowledgement resource offset field, that is, this field is reused for indication. Alternatively, in this implementation manner, the processor 84 may determine, based on a specified information field in downlink allocation, a resource unit occupied by a DMRS, where the foregoing specified information field may be a hybrid automatic repeat request acknowledgement resource offset field.

It should be noted that the user equipment shown in FIG. 8 may be configured to implement the method provided in the embodiment shown in FIG. 1 of the present invention, and descriptions about the first pattern, the second pattern, the first channel, the first signal, the second signal, and the like are the same as those in the foregoing method embodiment, and are not described herein again.

The foregoing user equipment uses, in a subframe in which there is a first signal transmitted and in a subframe in which there is no first signal transmitted, different DMRS patterns to determine a resource unit occupied by a DMRS, or when a frequency band for transmitting a downlink channel overlaps a frequency band for transmitting a first signal and when a frequency band for transmitting a downlink channel does not overlap a frequency band for transmitting a first signal, uses different DMRS patterns to determine a resource unit occupied by a DMRS, or when a downlink channel is an EPDCCH, uses a DMRS pattern with a relatively high priority to determine a resource unit occupied by a DMRS. In this way, different DMRS patterns can concurrently exist on an NCT carrier, and a DMRS pattern used for downlink transmission is determined according to priorities of different channels and/or signals in a downlink transmission process, which can ensure optimal performance of a high-priority channel and/or signal, and can further improve downlink transmission performance.

Figure 9:
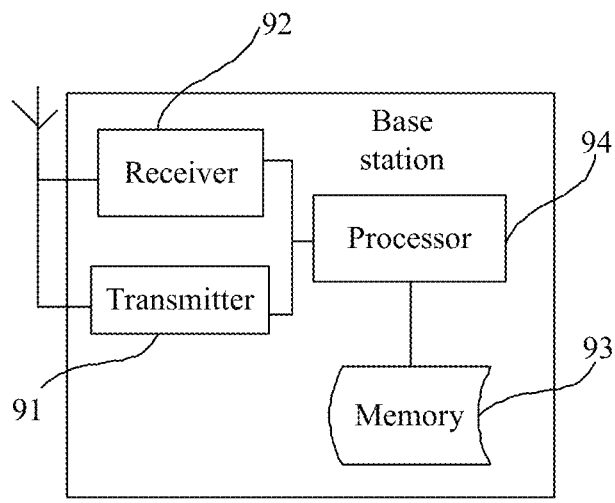
FIG. 9 is a schematic structural diagram of another embodiment of a base station according to the present invention.

FIG. 9 is a schematic structural diagram of another embodiment of a base station according to the present invention. As shown in FIG. 9, the base station may include a transmitter 91, a receiver 92, a memory 93, and a processor 94 that is connected to the transmitter 91, the receiver 92, and the memory 93 separately.

The memory 93 is configured to store a group of program code.

The processor 94 is configured to call the program code stored in the memory 93 to execute the following operation: determining a resource unit occupied by a DMRS.

The transmitter 91 is configured to send the DMRS on the resource unit that is occupied by the DMRS and determined by the processor 94, so that a user equipment decodes a downlink channel based on the foregoing DMRS.

In an implementation manner of this embodiment, the processor 94 is specifically configured to: determine, based on a first DMRS pattern and in a subframe in which there is a first signal transmitted, a resource unit occupied by a DMRS, and determine, based on a second DMRS pattern and in a subframe in which there is no first signal transmitted, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS.

In this implementation manner, both the foregoing subframe in which there is a first signal transmitted and the foregoing subframe in which there is no first signal transmitted belong to normal subframes, or both the foregoing subframe in which there is a first signal transmitted and the foregoing subframe in which there is no first signal transmitted belong to special subframes.

In another implementation manner of this embodiment, the processor 94 is specifically configured to: determine, based on a first DMRS pattern and in a subframe in which there is a first channel transmitted, a resource unit occupied by a DMRS, and determine, based on a second DMRS pattern and in a subframe in which there is no first channel transmitted, a resource unit occupied by a DMRS, where a time domain symbol occupied by the foregoing first DMRS pattern is not completely the same as a time domain symbol occupied by the foregoing second DMRS pattern.

In this implementation manner, the foregoing first channel is a PMCH, the foregoing subframe in which there is a first channel transmitted is an MBSFN subframe, and the foregoing subframe in which there is no first channel transmitted is a non-MBSFN subframe.

In still another implementation manner of this embodiment, the processor 94 is specifically configured to: determine whether a frequency band used to transmit the downlink channel overlaps a frequency band used to transmit a first signal, if overlapping exists, determine, based on a first DMRS pattern, a resource unit occupied by a DMRS, and if overlapping does not exist, determine, based on a second DMRS pattern, a resource unit occupied by a DMRS, where a time domain symbol occupied by the foregoing first DMRS pattern is not completely the same as a time domain symbol occupied by the foregoing second DMRS pattern.

In this implementation manner, the first signal may include one or a combination of a PSS, an SSS, a CSI-RS, a CRS, and a DRS.

In this implementation manner, both the foregoing subframe in which there is a first signal transmitted and the foregoing subframe in which there is no first signal transmitted belong to normal subframes, or both the foregoing subframe in which there is a first signal transmitted and the foregoing subframe in which there is no first signal transmitted belong to special subframes.

In the foregoing three implementation manners of this embodiment, the resource unit that is occupied by the DMRS and determined by the processor 94 based on the first DMRS pattern is located on the last two symbols of each timeslot; or the resource unit that is occupied by the DMRS and determined by the processor 94 based on the first DMRS pattern is located on the last two symbols of each timeslot, and the resource unit that is occupied by the DMRS and determined by the processor 94 based on the second DMRS pattern is located on the third symbol and the fourth symbol of each timeslot; or the resource unit that is occupied by the DMRS and determined by the processor 94 based on the second DMRS pattern is located on the second symbol and the third symbol in an even timeslot, and located on the sixth symbol and the seventh symbol in an odd timeslot; or the resource unit that is occupied by the DMRS and determined by the processor 94 based on the first DMRS pattern is located on the first symbol and the second symbol of each timeslot.

In yet another implementation manner of this embodiment, the processor 94 is specifically configured to: when the foregoing downlink channel is a PDSCH, determine, based on a first DMRS pattern, a resource unit occupied by a DMRS, and when the foregoing downlink channel is an EPDCCH, determine, based on a second DMRS pattern, a resource unit occupied by a DMRS.

In this implementation manner, if the resource unit that is occupied by the DMRS and determined by the processor 94 based on the second DMRS pattern overlaps a resource unit used to transmit a second signal, the second signal is not transmitted on an overlapping resource unit.

The foregoing second signal includes a CSI-RS or a CRS.

In still yet another implementation manner of this embodiment, the transmitter 91 is further configured to indicate, by using dynamic signaling, the resource unit that is occupied by the DMRS and determined by the processor 94 to the user equipment.

The foregoing dynamic signaling may be a PDCCH or an EPDCCH. Specifically, a specified information field in the PDCCH or the EPDCCH may be used to indicate a DMRS pattern corresponding to a current downlink channel. The foregoing specified information field may be a hybrid automatic repeat request acknowledgement resource offset field, that is, this field is reused for indication. Alternatively, in this implementation manner, the transmitter 91 may indicate the foregoing resource unit occupied by the DMRS to the user equipment by using a specified information field in downlink allocation, where the foregoing specified information field may be a hybrid automatic repeat request acknowledgement resource offset field.

It should be noted that the base station shown in FIG. 9 may be configured to implement the method provided in the embodiment shown in FIG. 5 of the present invention, and descriptions about the first pattern, the second pattern, the first channel, the first signal, the second signal, and the like are the same as those in the foregoing method embodiment, and are not described herein again.

In the foregoing embodiment, in a subframe in which there is a first signal transmitted and in a subframe in which there is no first signal transmitted, different DMRS patterns are used to determine a resource unit occupied by a DMRS, or when a frequency band for transmitting downlink channel data overlaps a frequency band for transmitting a first signal and when a frequency band for transmitting downlink channel data does not overlap a frequency band for transmitting a first signal, different DMRS patterns are used to determine a resource unit occupied by a DMRS, or when downlink channel data is EPDCCH data, a DMRS pattern with a higher priority is used to determine a resource unit occupied by a DMRS. In this way, different DMRS patterns can concurrently exist on an NCT carrier, and a DMRS pattern used for downlink transmission is determined according to priorities of different channels and/or signals in a downlink transmission process, which can ensure optimal performance of a high-priority channel and/or signal, and can further improve downlink transmission performance.

Persons skilled in the art may understand that the accompanying drawings are merely schematic diagrams of exemplary embodiments, and modules or processes in the accompanying drawings are not necessarily required for implementing the present invention.

Persons skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method, comprising:
    receiving, by a terminal device, higher layer signaling indicating a plurality of demodulation reference signal (DMRS) patterns, wherein the plurality of DMRS patterns comprises a first DMRS pattern and a second DMRS pattern;
    receiving, by the terminal device, dynamic signaling indicating either the first DMRS pattern or the second DMRS pattern, wherein the time domain symbols occupied by the first DMRS pattern are the first two symbols in a slot, and the time domain symbols occupied by the second DMRS pattern are the third and fourth symbols in a slot;
    determining, by the terminal device, a resource unit for transmitting a DMRS based on the pattern indicated by the dynamic signaling; and
    decoding, by the terminal device, a downlink channel based on the DMRS transmitted on the resource unit.

2. The method according to claim 1, wherein the dynamic signaling is physical downlink control channel signaling.

3. The method according to claim 1, wherein determining the resource unit comprises:
    determining, by the terminal device, a time domain symbol occupied by the DMRS based on an information element in the dynamic signaling.

4. An apparatus, comprising:
    a non-transitory memory configured to store a program code; and
    a processor in communication with the memory;
    wherein the program code, when executed by the processor, facilitates performance of the following by the apparatus:
    receiving higher layer signaling indicating a plurality of demodulation reference signal (DMRS) patterns, wherein the plurality of DMRS patterns comprises a first DMRS pattern and a second DMRS pattern;
    receiving dynamic signaling indicating either the first DMRS pattern or the second DMRS pattern, wherein the time domain symbols occupied by the first DMRS pattern are the first two symbols in a slot, and the time domain symbols occupied by the second DMRS pattern are the third and fourth symbols in a slot;
    determining a resource unit for transmitting a DMRS based on the pattern indicated by the dynamic signaling; and
    decoding a downlink channel based on the DMRS transmitted via the resource unit.

5. The apparatus according to claim 4, wherein the dynamic signaling is physical downlink control channel signaling.

6. The apparatus according to claim 4, wherein determining the resource unit comprises:
    determining a time domain symbol occupied by the DMRS based on an information element in the signaling.

7. A method, comprising:
    sending, by a network device, higher layer signaling indicating a plurality of demodulation reference signal (DMRS) patterns to a terminal device, wherein the plurality of DMRS patterns comprises a first DMRS pattern and a second DMRS pattern;
    sending, by the network device, dynamic signaling indicating either the first DMRS pattern or the second DMRS pattern to the terminal device, wherein the time domain symbols occupied by the first DMRS pattern are the first two symbols in a slot, and the time domain symbols occupied by the second DMRS pattern are the third and fourth symbols in a slot; and
    sending, by the network device, a DMRS based on the pattern indicated by the dynamic signaling.

8. The method according to claim 7, wherein the dynamic signaling is physical downlink control channel signaling.

9. An apparatus, comprising:
    a non-transitory memory configured to store a program code; and
    a processor in communication with the memory;
    wherein the program code, when executed by the processor, facilitates performance of the following by the apparatus:
    sending higher layer signaling indicating a plurality of demodulation reference signal (DMRS) patterns, wherein the plurality of DMRS patterns comprises a first DMRS pattern and a second DMRS pattern;
    sending dynamic signaling indicating either the first DMRS pattern or the second DMRS pattern, wherein the time domain symbols occupied by the first DMRS pattern are the first two symbols in a slot, and the time domain symbols occupied by the second DMRS pattern are the third and fourth symbols in a slot; and
    sending a DMRS based on the pattern indicated by the dynamic signaling.

10. The apparatus according to claim 9, wherein the dynamic signaling is physical downlink control channel signaling.

* * * * *